United States Patent US 11,287,538 B2
Tanino et al. Mar. 29, 2022

(54) SCINTILLATOR PANEL, RADIATION DETECTOR, AND METHOD FOR MANUFACTURING SCINTILLATOR PANEL

(71) Applicant: Toray Industries, Inc., Tokyo (JP)

(72) Inventors: Takahiro Tanino, Otsu (JP); Nobuyasu Fujioka, Otsu (JP); Hideyuki Kobayashi, Otsu (JP); Sho Miyao, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 16/975,215

(22) PCT Filed: Mar. 1, 2019

(86) PCT No.: PCT/JP2019/008231
§ 371 (c)(1),
(2) Date: Aug. 24, 2020

(87) PCT Pub. No.: WO2019/181444
PCT Pub. Date: Sep. 26, 2019

(65) Prior Publication Data
US 2020/0408936 A1 Dec. 31, 2020

(30) Foreign Application Priority Data
Mar. 23, 2018 (JP) .............................. JP2018-056655

(51) Int. Cl.
*G01T 1/202* (2006.01)
*G01T 1/20* (2006.01)

(52) U.S. Cl.
CPC .......... *G01T 1/2023* (2013.01); *G01T 1/2002* (2013.01); *G01T 1/2018* (2013.01)

(58) Field of Classification Search
None
See application file for complete search history.

(56) References Cited

U.S. PATENT DOCUMENTS 6,075,250 A * 6/2000 Fukui ....................... G21K 4/00
250/484.4
10,580,547 B2 * 3/2020 Tanino ................... G01T 1/202
(Continued)

FOREIGN PATENT DOCUMENTS

| JP | H09197097 A | 7/1997 |
| JP | H10123297 A | 5/1998 |
| JP | 2008261651 A | 10/2008 |

(Continued)

OTHER PUBLICATIONS

International Search Report and Written Opinion for International Application No. PCT/JP2019/008231, dated May 28, 2019 7 pages.
(Continued)

*Primary Examiner* — Edwin C Gunberg
(74) *Attorney, Agent, or Firm* — RatnerPrestia

(57) ABSTRACT

Provided is a scintillator panel including a substrate, grid-like barrier ribs formed on the substrate, and a phosphor layer in a cell separated by the barrier ribs, in which the barrier rib includes on its surface in the following order: a metallic reflective layer, and an inorganic protective layer mainly containing a nitride.

16 Claims, 1 Drawing Sheet

(56) References Cited

U.S. PATENT DOCUMENTS

2003/0001101 A1  1/2003  Homme et al.
2017/0236609 A1  8/2017  Tanino et al.

FOREIGN PATENT DOCUMENTS

| JP | 2011257339 A | 12/2011 |
| JP | 2012002627 A | 1/2012 |
| JP | 2014106022 A | 6/2014 |
| JP | 2017161407 A | 9/2017 |
| WO | 2011111551 A1 | 9/2011 |
| WO | 2016021540 A1 | 2/2016 |

OTHER PUBLICATIONS

International Preliminary Report on Patentability and Written Opinion for International Application No. PCT/JP2019/008231, dated Sep. 29, 2020, 10 pages.
Extended European Search Report for European Application No. 19770358.0, dated Nov. 11, 2021, 7 pages.

* cited by examiner

SCINTILLATOR PANEL, RADIATION DETECTOR, AND METHOD FOR MANUFACTURING SCINTILLATOR PANEL

CROSS REFERENCE TO RELATED APPLICATIONS

This is the U.S. National Phase application of PCT/JP2019/008231, filed Mar. 1, 2019, which claims priority to Japanese Patent Application No. 2018-056655, filed Mar. 23, 2018, the disclosures of these applications being incorporated herein by reference in their entireties for all purposes.

FIELD OF THE INVENTION

The present invention relates to scintillator panels, radiation detectors, and methods of manufacturing scintillator panels.

BACKGROUND OF THE INVENTION

Radiological images using films have been widely and conventionally used in medical settings. However, the radiological image using a film provides analog image information. Thus, in recent years, digital radiation detectors such as flat-panel radiation detectors (flat panel detectors: hereinafter abbreviated as "FPDs") have been developed. In FPDs, a scintillator panel is used for converting a radiation into visible light. The scintillator panel comprises radiosensitive phosphors. The radiosensitive phosphor emits visible light in response to an applied radiation. The emitted light is converted into electrical signals by a thin film transistor (TFT) or a charge-coupled device (CCD), resulting in conversion of the radiation information into digital image information. However, FPDs have a problem of reduction of image sharpness due to visible light scattered by the radiosensitive phosphors themselves when they emit light.

For reducing influences of the scattering of emitted light, methods of loading phosphors into spaces separated by barrier ribs having a reflective layer on the surface, that is, into cells, have been proposed. Patent Document 1 discloses a method using a high-refractive-index metallic oxide powder such as titanium oxide powder as a material of the reflective layer, while Patent Document 2 discloses a method using a highly reflective metal such as silver.

PRIOR ART REFERENCES

Patent Documents

Patent Document 1: WO2016/021540
Patent Document 2: Japanese Patent Laid-open Publication No. 2011-257339

SUMMARY OF THE INVENTION

However, reflective layers using a metallic oxide powder described in Patent Document 1 have low reflectivity and reduce the luminance. To obtain higher reflectivity, it is necessary to increase the thickness of the reflective layer. In that case, the reflective layer decreases the volume of cells, reducing the loading amount of phosphors. This results in reduced luminance of the scintillator panel. The method using silver described in Patent Document 2 is also likely to result in reduced reflectivity due to corrosion of the metallic reflective layer, such as composed of silver. For this reason, this method is likely to result in reduction of the initial luminance described later or reduction of the luminance in high temperature and high humidity environments. Patent Document 2 also discloses the formation of an acrylic protective layer on the surface of silver. Even in this case, however, sufficient preventive effects are not achieved against reduction of the initial luminance and reduction of the luminance in high temperature and high humidity environments.

In view of these conventional problems, the present invention has been made and aims to provide a scintillator panel having high luminance and high image sharpness and achieving reduced luminance reduction in high temperature and high humidity environments, and a radiation detector, as well as a method of manufacturing scintillator panels.

In one aspect of the present invention for solving the above-described problems, there is provided a scintillator panel comprising a substrate, grid-like barrier ribs formed on the substrate, and a phosphor layer in a cell separated by the barrier ribs, wherein the barrier rib has on its surface in the following order a metallic reflective layer, and an inorganic protective layer mainly containing a nitride.

In one aspect of the present invention for solving the above-described problems, there is provided a radiation detector comprising the scintillator panel described above.

In one aspect of the present invention for solving the above-described problems, there is provided a method of manufacturing scintillator panels comprising a barrier rib formation step of forming barrier ribs on a substrate to obtain a separated cell; a reflective layer formation step of forming a metallic reflective layer on the surface of the barrier rib; an inorganic protective layer formation step of forming an inorganic protective layer on the surface of the reflective layer; and a loading step of loading phosphors into the cell separated by the barrier ribs; wherein the inorganic protective layer mainly contains a nitride.

DETAILED DESCRIPTION OF EMBODIMENTS OF THE INVENTION

<Scintillator Panel>

Figure 1:
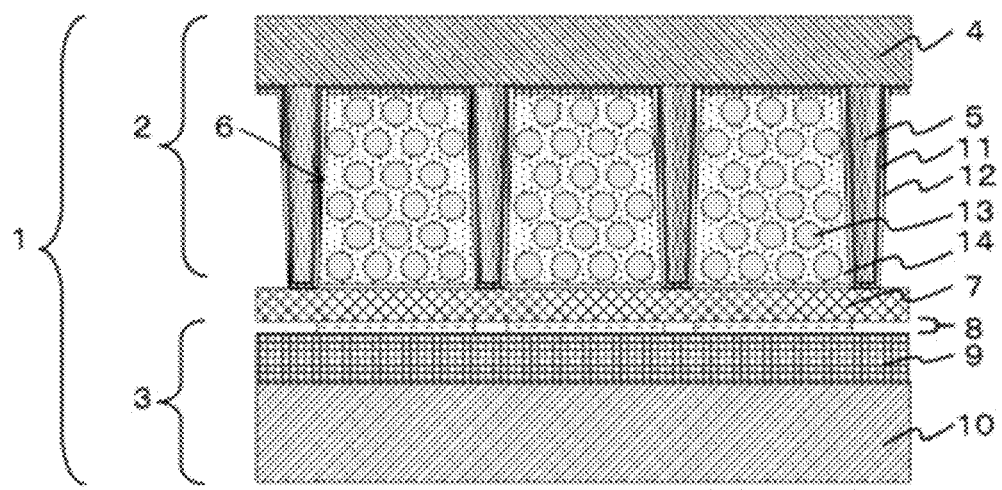
FIG. 1 is a schematic sectional view showing a radiation detector member including a scintillator panel in one embodiment of the present invention.

The specific structure of the scintillator panel in one embodiment of the present invention will be described with reference to the drawings. FIG. 1 is a schematic sectional view showing a radiation detector member 1 including a scintillator panel 2 in the present embodiment. The radiation detector member 1 includes the scintillator panel 2 and an output substrate 3. The scintillator panel 2 includes a substrate 4, barrier ribs 5, and phosphor layers 6 within cells separated by the barrier ribs 5. The output substrate 3 includes a substrate 10, an output layer 9 formed on the substrate 10, and a photoelectric conversion layer 8 containing photodiodes with the layer 8 being formed on the output layer 9. A diaphragm layer 7 may be provided on the photoelectric conversion layer 8. Preferably, the light exit surface of the scintillator panel 2 and the photoelectric conversion layer 8 of the output substrate 3 are bonded or adhered to each other with a diaphragm layer 7. A light emitted from the phosphor layer 6 reaches the photoelectric conversion layer 8 and is photoelectrically converted, and then is outputted. Now, the components will be described individually.

(Substrate 4)

The substrate 4 is a member included in the scintillator panel 2 in the present embodiment. Preferably, the material that forms the substrate 4 is radiotransparent. Examples of the material that forms the substrate 4 include various glass, polymeric materials, and metals. The glass includes quartz, borosilicate glass, and chemically strengthened glass. The polymeric compounds include cellulose acetate, polyesters such as polyethylene terephthalate, polyamides, polyimides, triacetates, polycarbonates, and carbon fiber reinforced resins. The metals include aluminum, iron, and copper. These materials may be used in combination. Particularly preferably, the material that forms the substrate 4 is a polymeric material having high radiotransparency. Preferably, the material that forms the substrate 4 is also excellent in flatness and heat resistance.

In the case of a glass substrate, the thickness of the substrate 4 is preferably 2.0 mm or less, more preferably 1.0 mm or less, from the viewpoint of weight reduction of the scintillator panel 2. In the case of a substrate made of a polymeric material, the thickness of the substrate 4 is preferably 3.0 mm or less.

(Barrier Rib 5)

The barrier rib 5 is provided to form at least a separated space (cell). The barrier rib 5 includes in the following order a metallic reflective layer 11, and an inorganic protective layer 12 mainly containing a nitride. The metallic reflective layer 11 and the inorganic protective layer 12 are required to be provided on at least a portion of the barrier rib 5.

Metallic Reflective Layer 11

The metallic reflective layer 11 is highly reflective even when it is a thin film. Thus, when the thin film metallic reflective layer 11 is provided, reduction of the amount of phosphors 13 loaded is prevented, and the luminance of the scintillator panel 2 is more likely to be increased. The metallic reflective layer 11 may be composed of any metal. For example, the metallic reflective layer 11 preferably mainly contains a highly reflective metal, such as silver or aluminum, and more preferably mainly contains silver. The metallic reflective layer 11 may be made of an alloy. The metallic reflective layer 11 is preferably made of a silver alloy containing at least one of palladium and copper, and more preferably is made of a silver alloy containing palladium and copper. The metallic reflective layer 11 made of such a silver alloy has excellent discoloration resistance in the atmosphere. As used herein, the term "mainly containing" means that a predetermined component is contained to be 50-100% by mass.

The metallic reflective layer 11 has any thickness. For example, the thickness of the metallic reflective layer 11 is preferably 10 nm or more, more preferably 50 nm or more. The thickness of the metallic reflective layer 11 is 500 nm or less, more preferably 300 nm or less. A metallic reflective layer 11 having a thickness of 10 nm or more will provide the scintillator panel 2 with sufficient light shielding properties, leading to increase in the image sharpness. When the thickness of the metallic reflective layer 11 is 500 nm or less, the metallic reflective layer 11 is less likely to have large irregularities on its surface, so that the reflectivity is less likely to be decreased. It is noted that a reflective layer formation step described later tends to form a metallic reflective layer 11 to be thicker near the top of the barrier rib while to be thinner near the bottom of the barrier rib on its side. Thus, in such a case where there is difference in thickness, the thickness of the metallic reflective layer 11 means the thickness on the side of and at the center in the height direction of the barrier rib.

The arithmetic mean inclination of the surface of the metallic reflective layer 11 is not particularly limited. For example, the arithmetic mean inclination is preferably 20 degrees or less, more preferably 10 degrees or less. When the arithmetic mean inclination is 20 degrees or less, the metallic reflective layer 11 has high flatness, so that the scintillator panel 2 is likely to have higher reflectivity and increased luminance. In the present embodiment, the arithmetic mean inclination can be measured by cleaving, for example, the substrate to expose a cross section of the sides of the barrier rib 5 with the metallic reflective layer 11 formed thereon, and observing the sides of the barrier rib 5 using a laser microscope (e.g., from KEYENCE CORPORATION).

Pixelated scintillators with a metallic reflective layer have challenges such as reduction of the initial luminance due to corrosion of the metallic reflective layer and reduction of the luminance in high temperature and high humidity environments. Reduction of the initial luminance means that the actual luminance is reduced as compared to the luminance of the scintillator panel, which is estimated based on the original reflectivity of the metallic reflective layer. It is assumed that this is caused by a reaction of the metallic reflective layer with components in the surface of the barrier rib or components in the phosphor layer, for example, during formation of the metallic reflective layer or formation of the phosphor layer after the formation of the metallic reflective layer, and consequent corrosion of the metallic reflective layer and reduction of the reflectivity. On the other hand, reduction of the luminance in high temperature and high humidity environments is assumed to be caused by, when a prepared scintillator panel is exposed to high temperature and high humidity, corrosion of the metallic reflective layer due to high-temperature water vapor and consequent reduction of the luminance over almost the entire surface of the scintillator panel. Since X-ray detectors increase their temperature during use and also are affected by water vapor contained in the atmosphere, the defects that occur in scintillators in high temperature and high humidity environment can occur due to long-term use of an X-ray detector. Therefore, it is necessary to reduce the occurrence of the defects in high temperature and high humidity environments. The scintillator panel 2 in the present embodiment is provided with an inorganic protective layer 12 described later, thereby solving the problems.

Inorganic Protective Layer 12

The scintillator panel 2 in the present embodiment include an inorganic protective layer 12 mainly containing a nitride formed on the metallic reflective layer 11. When the inorganic protective layer 12 is formed, the reduction of the reflectivity of the metallic reflective layer 11 due to the reaction between the metallic reflective layer 11 and a phosphor layer 6 during formation of the phosphor layer 6 is prevented, so that the scintillator panel 2 has increased initial luminance. The inorganic protective layer 12 also has a low water vapor permeability. Thus, the scintillator panel 2 including such inorganic protective layer 12 is less likely to reduce its luminance in high temperature and high humidity environments.

The inorganic protective layer 12 can be formed by a known method, such as sputtering method. The inorganic protective layer 12 is required to mainly contain a nitride, and the other components are not particularly restricted. The inorganic protective layer 12 mainly containing a nitride is preferred in that it has a low water vapor permeability and that the reflectivity of silver is less likely to decrease during the formation of the inorganic protective layer 12. Among nitrides, silicon nitride is particularly preferably used. It is not appropriate to form an inorganic layer mainly containing a non-nitride material (e.g., silicon oxide) on the metallic reflective layer 11 because it results in discoloration of the metallic reflective layer 11 and a consequent reduction in reflectivity and thereby a marked decrease in initial luminance.

The inorganic protective layer 12 has any thickness. For example, the thickness of the inorganic protective layer 12 is preferably 2 nm or more, more preferably 5 nm or more. The thickness of the inorganic protective layer 12 is preferably 200 nm or less, more preferably 100 nm or less. When the thickness of the inorganic protective layer 12 is 2 nm or more, the scintillator panel 2 can enjoy a greater preventive effect on luminance reduction in high temperature and high humidity environments. When the thickness of the inorganic protective layer 12 is 200 nm or less, coloring is less likely to occur. Thus, the luminance of the scintillator panel 2 can be further increased. The thickness of the inorganic protective layer 12 can be measured by exposing a cross section perpendicular to the barrier rib substrate with a polishing machine such as Cross Section Polisher, and observing it with a scanning electron microscope or a transmission electron microscope. It is noted that an inorganic protective layer formation step described later tends to form an inorganic protective layer 12 to be thicker near the top of the barrier rib while to be thinner near the bottom of the barrier rib on its side. Thus, in such a case where there is difference in thickness, the thickness of the inorganic protective layer 12 means the thickness on the side of and at the center in the height direction of the barrier rib.

In a preferred embodiment, an organic protective layer is formed on the scintillator panel 2. The organic protective layer mainly contains organic compounds. As used herein, the term "organic compounds" mean those excluding, from carbon-containing compounds, some simple carbon compounds (carbon monoxide, carbon dioxide, carbonates, cyanides, cyanates, and thiocyanates) and allotropes of carbon (such as graphite and diamond). When the organic protective layer is formed, the initial luminance is likely to be further increased. Also, pinhole defects are likely to be reduced. As used herein, the term "pinhole defects" means a problem in which, during an accelerated durability test in which a prepared scintillator panel is exposed to high temperature and high humidity, the luminance of the scintillator panel is excessively reduced in a narrow area of about one to several cells and the area becomes a dark spot when irradiated with X-rays. Since pinhole defects tend to originate in small areas without formation of a metallic reflective layer, it is assumed that the pinhole defects are caused by a localized and concentrated electrochemical corrosion reaction due to direct contact with hot water vapor at the boundary between areas with or without formation of a metallic reflective layer. Pinhole defects are also reduced by formation of the inorganic protective layer 12, but are likely to be more remarkably reduced by formation of the organic protective layer.

Preferably, the organic protective layer mainly contains a fluorine-containing resin or polysiloxane. When an organic protective layer mainly containing a fluorine-containing resin or polysiloxane is formed, the scintillator panel 2 has increased initial luminance. Furthermore, the scintillator panel 2 shows remarkably reduced pinhole defects and reduced luminance reduction in high temperature and high humidity environments. The reflectivity of the metallic reflective layer is affected by the organic protective layer. Lower refractive index of the organic protective layer results is likely result in increased reflectivity of the metallic reflective layer, so that the luminance of the scintillator panel can be further increased. Fluorine-containing resins have low refractive index. Thus, an organic protective layer mainly containing a fluorine-containing resin can further increase the reflectivity of the metallic reflective layer, thereby further increasing the luminance. In the case without a fluorine-containing resin or polysiloxane as a main component, the effect of reducing pinhole defects in the scintillator panel 2 in high temperature and high humidity environments can be insufficient.

The organic protective layer may be formed on the inorganic protective layer 12, or between the barrier rib 5 and the metallic reflective layer 11. In either case, the scintillator panel 2 has increased initial luminance, and reduced pinhole defects in high temperature and high humidity environments.

When an organic protective layer is formed on the inorganic protective layer 12, the reduction of the reflectivity of the metallic reflective layer 11 due to the reaction between the metallic reflective layer 11 and a phosphor layer 6 during formation of the phosphor layer 6 is further prevented, so that the scintillator panel 2 is likely to have further increased initial luminance. In addition, the organic protective layer covers small areas without formation of a metallic reflective layer in the metallic reflective layer 11 in the scintillator panel 2, which the areas otherwise cause pinhole defects. This prevents the scintillator panel 2 from being directly contact with high-temperature water vapor, so that pinhole defects are likely to be prevented.

When an organic protective layer is formed between the barrier rib 5 and the metallic reflective layer 11, reactions between barrier rib components and the metallic reflective layer 11 in the scintillator panel 2 are reduced. In addition, the surface of the barrier rib 5 is flattened, which increases the reflectivity of the metallic reflective layer 11, so that the scintillator panel 2 is likely to show further increased initial luminance. Furthermore, the unevenness of the surface of the barrier rib 5 is covered, and thus the occurrence of areas without formation of a metallic reflective layer 11, which the areas otherwise cause pinhole defects, is prevented, so that the scintillator panel 2 is likely to show reduced pinhole defects.

The thickness of the organic protective layer is preferably 0.05 μm or more, more preferably 0.2 μm or more. The thickness of the organic protective layer is preferably 10 μm or less, more preferably 5 μm or less. When the thickness of the organic protective layer is 0.05 μm or more, the scintillator panel 2 can enjoy greater effects of increasing the initial luminance and of reducing pinhole defects. When the thickness of the organic protective layer is 10 μm or less, the cell has larger volume and increased loading amount of the phosphor 13, so that the scintillator panel 2 can have further increased luminance. In the present embodiment, the thickness of the organic protective layer can be measured by a scanning electron microscopy. It is noted that an organic protective layer formation step described later tends to form an organic protective layer to be thicker near the top of the barrier rib on its side while to be thinner near the bottom of the barrier rib on its side. Thus, in such a case where there is difference in thickness, the above-described thickness of the organic protective layer means the thickness on the side of and at the center in the height direction of the barrier rib 5.

In the present embodiment, polysiloxane that is mainly contained in the organic protective layer preferably comprises a hydrolyzed and partially condensed organosilane comprising organosilane represented by the general formula (1) below:

[Chem 1]

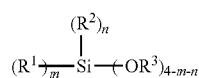

(1)

wherein,
$R^1$ represents a monovalent organic group having at least one of epoxy group and acid anhydride group;
$R^2$ and $R^3$ each represent hydrogen, a $C_{1-6}$ alkyl group, a $C_{2-6}$ acyl group, or a $C_{6-16}$ aryl group;
m represents an integer from 1 to 3;
n represents an integer from 0 to 2;
m+n is 1 to 3;
when m is 2 or more, a plurality of $R^1$ are optionally the same or different;
when n is 2, a plurality of $R^2$ are optionally the same or different;
when m+n is 2 or less, a plurality of $R^3$ are optionally the same or different.
The epoxy group and the acid anhydride group in $R^1$ represent structures of the following chemical formulae (2) and (3), respectively.

[Chem 2]

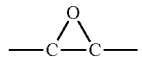

(2)

[Chem 3]

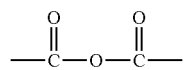

(3)

In the case without a hydrolyzed and partially condensed organosilane composed of organosilane represented by the general formula (1) described above, polysiloxane repels a phosphor layer 6 and causes loading unevenness during the step of forming a phosphor layer 6, so that the scintillator panel 2 is likely to have luminance unevenness. Furthermore, in this case, and even in the case where an organic protective layer is formed between the barrier rib 5 and the metallic reflective layer 11, the scintillator panel 2 is likely to have luminance unevenness. This is probably caused by some components of the organic protective layer permeating through the metallic reflective layer 11 and the inorganic protective layer 12, moving to the surface of the inorganic protective layer 12, and repelling a phosphor layer 6. On the other hand, in the case with a hydrolyzed and partially condensed organosilane composed of organosilane represented by the general formula (1) described above, repellence against phosphor layer 6 is reduced, so that luminance unevenness is likely to be reduced.

Any organosilane represented by the general formula (1) above can be used. Examples of the organosilane represented by the general formula (1) include 2-(3,4-epoxycyclohexyl)ethyltrialkoxysilane, 3-trialkoxysilylpropylsuccinic anhydride, 3-glycidoxypropyltrialkoxysilane, and 3-glycidoxypropylmethyldialkoxysilane. Among them, organosilane represented by the general formula (1) preferably includes at least one of 2-(3,4-epoxycyclohexyl)ethyltrialkoxysilane and 3-trialkoxysilylpropylsuccinic anhydride. This tends to allow the scintillator panel to have further reduced luminance unevenness, and further reduced occurrence of pinhole defects in high temperature and high humidity environments.

In polysiloxane comprising a hydrolyzed and partially condensed organosilane composed of organosilane represented by the general formula (1) described above, some or all of the epoxy groups and the acid anhydride groups may be ring-opened during the hydrolysis or partial condensation reaction of polysiloxane.

The content of the hydrolyzed and partially condensed organosilane represented by the general formula (1) above in the organic protective layer is not particularly limited. In the case of a hydrolysate or partial condensate of organosilane represented by the general formula (1) and other organosilane, the content of the hydrolyzed and partially condensed organosilane represented by the general formula (1) means the content of a structure unit derived from the organosilane represented by the general formula (1). For example, the content of a hydrolyzed and partially condensed organosilane represented by the general formula (1) above is preferably 5 mol % or more, more preferably 10 mol % or more. When the content of a hydrolyzed and partially condensed organosilane represented by the general formula (1) above is 5 mol % or more, repellence against phosphor layer 6 is markedly reduced, so that the scintillator panel 2 has greatly reduced luminance unevenness.

When the organic protective layer is mainly composed of a fluorine-containing resin, the fluorine-containing resin is preferably amorphous. An amorphous fluorine-containing resin is excellent in solvent solubility. Thus, an organic protective layer mainly containing such a fluorine-containing resin can be easily formed by a known method, such as solution coating or spray coating. As used herein, the sentence "a fluorine-containing resin is amorphous" means the case where measurement of a fluorine-containing resin by powder X-ray diffractometry results in substantially no peak due to its crystal structure, but only broad halo.

Particularly preferably, the fluorine-containing resin has a structure in which fluorine atoms are directly bound to backbone atoms. A fluorine-containing resin with the backbone atoms directly bound to fluorine atoms is excellent in solvent resistance. Thus, an organic protective layer mainly containing such a fluorine-containing resin is less likely to be swollen or dissolve during formation of the phosphor layer, so that a reflectivity reduction due to a reaction between components contained in the phosphor layer and the metallic reflective layer is reduced. This allows the obtained scintillator panel to have further increased luminance.

Preferably, the fluorine-containing resin has a structure represented by the general formula (4) below as a repeating unit. The fluorine-containing resin may be a copolymer comprising a structure represented by the general formula (4) below and another structure, in which the structure represented by the general formula (4) below is mainly contained. When the fluorine-containing resin is a copolymer having two structures that are different from each other and represented by the general formula (4) below, the copolymer may be an alternating copolymer, a block copolymer, or a random copolymer.

[Chem 4]

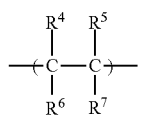

(4)

In the general formula (4) above, $R^4$ to $R^7$ represent a hydrogen atom, a halogen atom, a substituted or unsubstituted alkyl group, a substituted or unsubstituted alkenyl group, a substituted or unsubstituted alkynyl group, a hydroxy group, a substituted or unsubstituted alkoxy group, a substituted or unsubstituted aryl group, a cyano group, an aldehyde group, a substituted or unsubstituted ester group, an acyl group, a carboxyl group, a substituted or unsubstituted amino group, a nitro group, or a substituted or unsubstituted epoxy group. Alternatively, two of $R^4$ to $R^7$ may together form a ring structure. However, at least one of $R^4$ to $R^7$ is a fluorine atom, or a group containing a fluorine atom. One or more of $R^4$ to $R^7$ is preferably a fluorine atom, and two or more is more preferably a fluorine atom. Examples of substituents when the groups are substituted include halogens, alkyl groups, aryl groups, and alkoxy groups. $R^4$ to $R^7$ may be the same or different.

In the general formula (4) above, the alkyl group may be chain or cyclic, and preferably is $C_{1-12}$. Preferably, the alkenyl group is $C_{1-15}$. Preferably, the alkynyl group is $C_{1-10}$. Preferably, the alkoxy group is $C_{1-10}$. Preferably, the aryl group is $C_{6-40}$.

Preferably, the structure represented by the general formula (4) above has a saturated ring structure. In an amorphous fluorine-containing resin having a saturated ring structure, the structure represented by the general formula (4) is preferably a structure represented by the general formula (5) below.

[Chem 5]

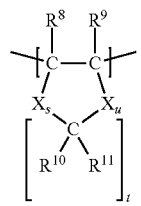

(5)

In the general formula (5) above, X represents oxygen, s and u each independently represent 0 or 1, and t represents an integer of 1 or more.

In the general formula (5) above, $R^8$ to represent a hydrogen atom, a halogen atom, a substituted or unsubstituted alkyl group, a substituted or unsubstituted alkenyl group, a substituted or unsubstituted alkynyl group, a hydroxy group, a substituted or unsubstituted alkoxy group, a substituted or unsubstituted aryl group, a cyano group, an aldehyde group, a substituted or unsubstituted ester group, an acyl group, a carboxyl group, a substituted or unsubstituted amino group, a nitro group, or a substituted or unsubstituted epoxy group. Preferably, at least one of $R^8$ and $R^9$ is a fluorine atom. Preferably, at least one of $R^{10}$ and $R^{11}$ is also a fluorine atom.

In the above-described general formula (5), s and u represent the number of oxygen atoms. However, when s or u is 0, $X_s$ or $X_u$ is a single bond. At least one of s and u is preferably 1, which results in suitable glass transition temperature.

In the above-described general formula (5), t represents a repeat number, and is preferably from 1 to 4, more preferably from 1 to 3. When t is 2 or more, a plurality of $R^{10}$ and $R^{11}$ may be the same or different.

In the above-described general formula (5) above, the alkyl group is preferably $C_{1-8}$. Preferably, the alkenyl group is $C_{1-12}$. Preferably, the alkoxy group is $C_{1-10}$. Preferably, the aryl group is $C_{5-15}$.

When an amorphous fluorine-containing resin is contained, the end of the backbone of the amorphous fluorine-containing resin may be substituted with, for example, a functional group such as a substituted or unsubstituted amino group, a substituted or unsubstituted carboxyl group, an alcohol group, an acyl group, a substituted or unsubstituted silyl group, a substituted or unsubstituted phosphonyl group, a substituted or unsubstituted sulfonyl group, a cyano group, a nitro group, a vinyl group, or a substituted or unsubstituted epoxy group. Examples of substituents when the groups are substituted include halogens, alkyl groups, aryl groups, alkoxy groups, and silyl groups. In this case, the alkyl group is preferably $C_{1-8}$. Preferably, the alkenyl group is $C_{1-10}$. Preferably, the alkoxy group is $C_{1-10}$. Preferably, the aryl group is $C_{5-15}$. Among these functional groups, a carboxyl group, an acyl group, a silyl group, or a phosphonyl group is preferred from the viewpoint of reducing luminance unevenness.

When an amorphous fluorine-containing resin is contained, the number average molecular weight of the amorphous fluorine-containing resin is preferably 3,000 or more, more preferably 5,000 or more from the viewpoint of weather resistance and solvent resistance. The number average molecular weight of the amorphous fluorine-containing resin is preferably 60,000 or less, more preferably 50,000 or less from the viewpoint of weather resistance and solvent resistance. An amorphous fluorine-containing resin having a number average molecular weight of 3,000 or more achieves good weather resistance and solvent resistance, preventing the protective layer from swelling or dissolving during phosphor layer formation. This allows the obtained scintillator panel to have increased luminance. An amorphous fluorine-containing resin having a number average molecular weight of 60,000 or less is well soluble in a solvent during protective layer formation, facilitating the formation of the protective layer by a known method.

Returning to the description of the entire barrier rib 5, the barrier rib 5 is preferably made of an inorganic material in order to increase its strength and heat resistance. Inorganic materials refer to some simple carbon compounds (e.g., allotropes of carbon such as graphite and diamond) and compounds made of non-carbon elements. The phrase "made of an inorganic material" does not strictly exclude the presence of other components than inorganic materials, but permits the presence of impurities contained in inorganic materials themselves as the raw materials, or the presence of other components than inorganic materials such as impurities contaminated during the process of manufacturing the barrier rib 5.

Preferably, the barrier rib 5 is mainly composed of glass. Glass refers to an inorganic amorphous solid containing a silicate. When the barrier rib 5 is mainly composed of glass, the barrier rib 5 shows increased strength and heat resistance and is less likely to be deformed or damaged during the steps of forming the metallic reflective layer 11 and of loading the phosphors 13. The phrase "mainly composed of glass" means that glass constitutes 50 to 100% by mass of materials that form the barrier rib 5.

The barrier rib 5 preferably contains 95% by volume or more of a low-softening-point glass having a softening point of 650° C. or lower, more preferably 98% by volume or more. When the content of the low-softening-point glass is 95% by volume or more, the barrier rib 5 is likely to obtain flattened surface during the firing step. This allows the scintillator panel 2 to have smaller arithmetic mean inclination of the surface of the metallic reflective layer 11 when the metallic reflective layer 11 is formed on the surface of the barrier rib 5, resulting in increased reflectivity and further increased initial luminance. The arithmetic mean inclination of the surface of the metallic reflective layer 11 can be measured by cleaving the barrier rib substrate to expose a cross section, imaging the sides of the barrier rib 5 with a laser microscope, and analyzing the images.

Other components than a low-softening-point glass contained in the barrier rib 5 are high-softening-point glass powders, ceramic powders, and the like. These powders facilitate the adjustment of the shape of the barrier rib 5 during the barrier rib formation step. In order to increase the content of a low-softening-point glass, the content of other components than the low-softening-point glass is preferably less than 5% by volume.

Figure 2:
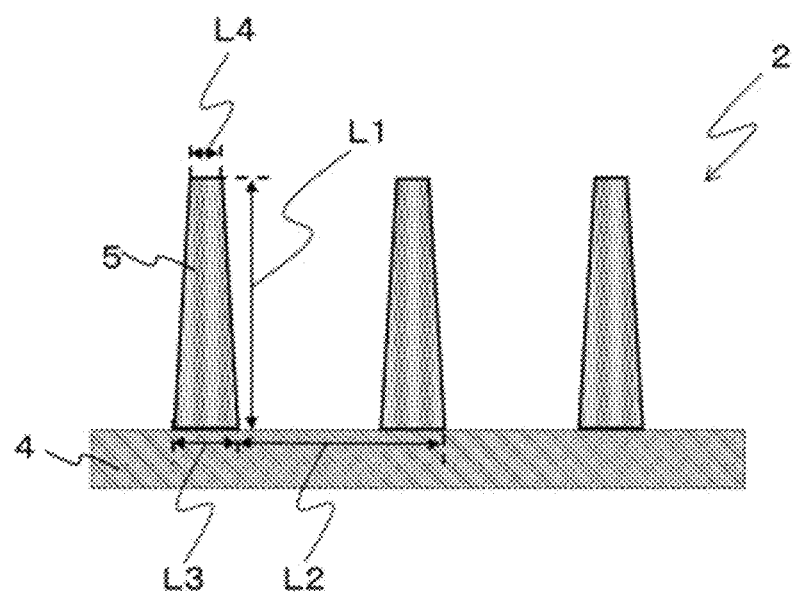
FIG. 2 is a schematic sectional view showing the scintillator panel in one embodiment of the present invention.

FIG. 2 is a schematic sectional view showing the scintillator panel 2 in the present embodiment (the phosphor layer 6 is not shown; see FIG. 1 for the phosphor layer 6). The height of the barrier rib 5, L1, is preferably 50 μm or more, more preferably 70 μm or more. The height of the barrier rib 5 is preferably 3,000 μm or less, more preferably 1,000 μm or less. When L1 is 3,000 μm or less, the phosphor 13 is less likely to absorb light emitted by itself, which results in prevention of decrease in the luminance of the scintillator panel 2. On the other hand, when L1 is 50 μm or more, a suitable amount of the phosphor 13 that can be loaded is achieved, which results in prevention of decrease in the luminance of the scintillator panel 2.

The interval between the adjacent barrier ribs 5, L2, is preferably 30 μm or more, more preferably 50 μm or more. The interval between the barrier ribs 5, L2, is preferably 1,000 μm or less, more preferably 500 μm or less. When L2 is 30 μm or more, the phosphors 13 are easily loaded into cells in the scintillator panel 2. On the other hand, when L2 is 1,000 μm or less, the scintillator panel 2 achieves excellent image sharpness.

The bottom width of the barrier rib 5, L3, is preferably 5 μm or more, more preferably 10 μm or more. The bottom width L3 is preferably 150 μm or less, more preferably 50 μm or less. When L3 is 5 μm or more, the scintillator panel 2 is less likely to have pattern defects. On the other hand, when L3 is 150 μm or less, a suitable amount of the phosphor 13 that can be loaded is achieved, and the luminance of the scintillator panel 2 is less likely to decrease.

The top width of the barrier rib 5, L4, is preferably 3 μm or more, more preferably 5 μm or more. The top width L4 is preferably 80 μm or less, more preferably 50 μm or less. When L4 is 3 μm or more, the barrier rib 5 has a suitable strength, and the scintillator panel 2 is less likely to have pattern defects. On the other hand, when L4 is 80 μm or less, the scintillator panel 2 has a suitable area from which light emitted from the phosphor 13 can be extracted, and its luminance is less likely to decrease.

The aspect ratio (L1/L3) of the height of the barrier rib 5, L1, to the bottom width of the barrier rib 5, L3, is preferably 1.0 or more, more preferably 2.0 or more. The aspect ratio (L1/L3) is preferably 100.0 or less, more preferably 50.0 or less. When the aspect ratio (L1/L3) is 1.0 or more, the phosphor 13 in the scintillator panel 2 is likely to achieve a suitable load. When the aspect ratio (L1/L3) is 100.0 or less, the barrier rib in the scintillator panel 2 is likely to achieve a suitable strength.

The aspect ratio (L1/L2) of the height of the barrier rib 5, L1, to the interval between the barrier ribs 5, L2, is preferably 0.5 or more, more preferably 1.0 or more. The aspect ratio (L1/L2) is preferably 20.0 or less, more preferably 10.0 or less. When the aspect ratio (L1/L2) is 0.5 or more, the X-ray absorption efficiency of the scintillator panel 2 is less likely to decrease. When the aspect ratio (L1/L2) is 20.0 or less, the light extraction efficiency of the scintillator panel 2 is less likely to decrease, so that its luminance is less likely to decrease.

The height of the barrier rib 5, L1, and the interval between adjacent barrier ribs 5, L2, can be measured by exposing a cross section perpendicular to the substrate by cleaving or using a polishing machine such as Cross Section Polisher, and observing the cross section with a scanning electron microscope. Here, the width of the barrier rib 5 at the contact portion between the barrier rib 5 and the substrate is defined as L3. The width of the top portion of the barrier rib 5 is defined as L4.

In the present embodiment, the cells in the scintillator panel 2 is separated by barrier ribs 5. Thus, in the scintillator panel 2, the size and pitch of pixels of a photoelectric conversion element arranged in a grid-like shape can be made coincident with the size and pitch of cells of the scintillator panel 2, so that the pixels of the photoelectric conversion element can be corresponding to the cells of the scintillator panel 2. This is likely to lead to high image sharpness in the scintillator panel 2.

(Phosphor Layer 6)

As shown in FIG. 1, a phosphor layer 6 is formed in a cell separated by barrier ribs 5. The phosphor layer 6 absorbs energy of an incident radiation such as an X-ray to emit an electromagnetic wave having a wavelength ranging from 300 nm to 800 nm, i.e. a light ranging from ultraviolet light to infrared light with visible light at the center. A light emitted from the phosphor layer 6 is photoelectrically converted in a photoelectric conversion layer 8 and outputted as electrical signals via an output layer 9. Preferably, the phosphor layer 6 comprises a phosphor 13 and a binder resin 14.

Phosphor 13

The phosphor 13 is not particularly restricted. For example, the phosphor 13 is one having a high conversion rate from radiation to visible light, such as CsI, $Gd_2O_2S$, $Lu_2O_2S$, $Y_2O_2S$, $LaCl_3$, $LaBr_3$, $LaI_3$, $CeBr_3$, $CeI_3$, $LuSiO_5$, or Ba(Br, F).

An activator may be added to the phosphor 13 in order to increase the luminous efficiency. Any activator can be used. Examples of the activator include sodium (Na), indium (In), thallium (Tl), lithium (Li), potassium (K), rubidium (Rb), sodium (Na), terbium (Tb), cerium (Ce), europium (Eu), and praseodymium (Pr). Among them, the phosphor 13 is preferably a phosphor obtained by adding Tb to $Gd_2O_2S$ (hereinafter, "GOS: Tb") in view of its high chemical stability and high luminous efficiency.

Binder Resin 14

The binder resin 14 is not particularly restricted. Examples of the binder resin 14 include thermoplastic resins, thermosetting resins, and photocurable resins. More specifically, the binder resin 14 include acrylic resins, acetal resins, cellulose derivatives, polysiloxane resins, epoxy resins, melamine resins, phenolic resins, urea resins, vinyl chloride resins, polyester resins such as polyethylene terephthalate and polyethylene naphthalate, polyethylene, polypropylene, polystyrene, polyvinyl toluene, and polyphenylbenzene. Among them, the binder resin 14 preferably contains at least one of acrylic resins, acetal resins, and cellulose derivatives, and more preferably mainly contains 1 to 3 of them. This prevents the occurrence of repellence by the organic protective layer, so that the scintillator panel 2 is likely to have reduced luminance unevenness. The phrase "mainly containing at least one of acrylic resins, acetal resins, and cellulose derivatives" means that the total amount of the acrylic resins, acetal resins, and cellulose derivatives is 50 to 100% by mass of materials that constitute the resin.

Preferably, the binder resin 14 is in contact with the inorganic protective layer 12 or the organic protective layer. In this case, the binder resin 14 is required to be in contact with at least part of the inorganic protective layer 12 or the organic protective layer. This prevents the phosphor 13 from dropping out of the cell in the scintillator panel 2. As shown in FIG. 1, the binder resin 14 may be loaded in the cell such that almost no void space exists, or may be loaded such that a void space exists.

Thus, according to the present embodiment, the scintillator panel 2 is likely to have high luminance and high image sharpness and have reduced occurrence of luminance reduction in high temperature and high humidity environments.

<Radiation Detector>

The radiation detector according to one embodiment of the present invention can be produced by placing the radiation detector member 1 in a case. Alternatively, the radiation detector can be produced by removing a scintillator in a commercially available radiation detector, and placing the scintillator panel 2 in one embodiment of the present invention instead.

<Method of Manufacturing Scintillator Panels>

In one aspect of the present invention, there is provided a method of manufacturing scintillator panels comprising a barrier rib formation step of forming barrier ribs on a substrate to obtain a separated cell; a reflective layer formation step of forming a metallic reflective layer on the surface of the barrier rib; an inorganic protective layer formation step of forming an inorganic protective layer on the surface of the reflective layer; and a loading step of loading phosphors into the cell separated by the barrier ribs. Now, the steps will be described individually. Hereinafter, the same components as those described in the above embodiment of the scintillator panel will be omitted as appropriate.

(Barrier Rib Formation Step)

The barrier rib formation step is a step of forming a barrier rib on a substrate. Any method can be used to form a barrier rib on a substrate. Various known methods to form barrier ribs can be used, and previously used is a photosensitive paste method from the viewpoint of ease of shape control.

A barrier rib mainly composed of glass can be formed by, for example, an application step of applying a photosensitive paste containing a glass powder on a substrate to obtain a coating film; a pattern formation step of exposing to light and developing the coating film to obtain a pre-firing barrier rib pattern; and a firing step of firing the pattern to obtain a barrier rib pattern.

Application Step

The application step is a step of applying a glass powder-containing paste on the entire or part of the surface of a substrate to obtain a coating film. The substrate to be used may be a highly heat resistant support, such as a glass plate or ceramic plate. Examples of the method of applying a glass powder-containing paste include screen printing, bar coater, roll coater, die coater, or blade coater. The thickness of the coating film to be obtained can be adjusted, for example, by the number of application, the mesh size of the screen, or the viscosity of the paste.

Production of a barrier rib mainly composed of glass requires 50 to 100% by mass of the inorganic components contained in the glass powder-containing paste used in the application step to be a glass powder.

The glass powder contained in the glass powder-containing paste is preferably a glass that is softened at the firing temperature, more preferably a low-softening-point glass having a softening point of 650° C. or lower. The softening point can be determined by extrapolating a heat absorption completion temperature at an endothermic peak by a tangent method from a DTA curve obtained by measuring a sample using a differential thermal analyzer (e.g., Differential Type Differential Thermal Balance TG8120; manufactured by Rigaku Corporation). More specifically, first, an inorganic powder as a measurement sample is measured by elevating the temperature at 20° C./minute from room temperature with an alumina powder as a standard sample using a differential thermal analyzer, thereby obtaining a DTA curve. Then, a third flexion point in the obtained DTA curve is extrapolated by a tangent method to obtain a softening point Ts, which can be defined as a softening point.

For obtaining a low-melting-point glass, a metal oxide can be used, selected from the group consisting of lead oxide, bismuth oxide, zinc oxide, and alkali metal oxides, which are compounds effective for making glass to have a lower melting point. Preferably, the softening point of glass is adjusted with an alkali metal oxide. The alkali metal refers to a metal selected from the group consisting of lithium, sodium, and potassium.

The percentage of the alkali metal oxide in the low-softening-point glass is preferably 2% by mass or more, more preferably 5% by mass or more. The percentage of the alkali metal oxide in the low-softening-point glass is preferably 20% by mass or less, more preferably 15% by mass or less. When the percentage of the alkali metal oxide is 2% by mass or more, a suitable softening point can be obtained, which prevents the need for the firing step to be performed at high temperature, so that the barrier rib is less likely to have defects. On the other hand, when the percentage of the alkali metal oxide is 20% by mass or less, an excess decrease in the viscosity of the glass during the firing step is prevented, so that the obtained grid-like pattern after firing is less likely to have a deformed shape.

Preferably, the low-softening-point glass contains 3 to 10% by mass of zinc oxide for proper adjustment of viscosity at a high temperature. When the percentage of zinc oxide in the low-softening-point glass is 3% by mass or more, the low-softening-point glass is likely to have a suitable viscosity at a high temperature. On the other hand, when the content of zinc oxide is 10% by mass or less, the low-softening-point glass is likely to have a reasonable manufacturing cost.

Preferably, the low-softening-point glass contains at least one metallic oxide selected from the group consisting of silicon oxide, boron oxide, aluminum oxide, and alkaline earth metal oxides from the viewpoint of adjustment of the stability, crystallizability, transparency, refractive index, or thermal expansion properties. Here, the alkali earth metal refers to a metal selected from the group consisting of magnesium, calcium, barium, and strontium. A preferred exemplary composition range of the low-softening-point glass is as shown below:

Alkali metal oxide: 2 to 20% by mass;
Zinc oxide: 3 to 10% by mass;
Silicon oxide: 20 to 40% by mass;
Boron oxide: 25 to 40% by mass;
Aluminum oxide: 10 to 30% by mass;
Alkali earth metal oxide: 5 to 15% by mass.

The particle diameter of inorganic powders including glass powders can be measured using a particle size distribution analyzer, e.g., MT3300 (manufactured by Nikkiso Co., Ltd.). More specifically, the particle diameter can be measured after injecting the inorganic powder to the sample chamber of the particle size distribution analyzer filled with water and sonicating it for 300 seconds.

The 50% volume average particle diameter of the low-softening-point glass powder (hereinafter, abbreviated as "D50") is preferably 1.0 μm or more, more preferably 2.0 μm or more. D50 is also preferably 4.0 μm or less, more preferably 3.0 μm or less. When D50 is 1.0 μm or more, the glass powder is less likely to aggregate, showing uniform dispersibility, so that the obtained paste has suitable flow stability. On the other hand, when D50 is 4.0 μm or less, the surface unevenness of the post-firing pattern obtained in the firing step is less likely to be large and to thereafter cause destruction of the barrier rib.

In addition to the low-softening-point glass, the glass powder-containing paste may contain a high-softening-point glass having a softening point of over 700° C. or ceramic particles such as silicon oxide, aluminum oxide, titanium oxide, or zirconium oxide as a filler in order to control the contraction percentage of the grid-like pattern during the firing step or to retain the shape of the finally obtained barrier rib. The percentage of the filler in the entire inorganic components is preferably 2% by volume or less in order to improve the flatness of the barrier rib. Preferably, the filler has the same D50 as the low-softening-point glass powder.

In the photosensitive glass powder-containing paste, the refractive index n1 of the glass powder and the refractive index n2 of the organic component satisfy preferably $-0.1<n1-n2<0.1$, more preferably $-0.01 \leq n1-n2 \leq 0.01$, still more preferably $-0.005 \leq n1-n2 \leq 0.005$, in order to reduce light scattering during light exposure and allow formation of a high-precision pattern. The refractive index of the glass powder can be adjusted as appropriate by varying the composition of metallic oxides contained in the glass powder.

The refractive index of the glass powder can be measured using a Becke line detection method. The refractive index of the organic component can be determined by measuring a coating film composed of the organic component by ellipsometry. More specifically, the refractive index (ng) of the glass powder or the organic component at 25° C. and at a wavelength of 436 nm (g-ray) can be defined as n1 or n2, respectively.

The photosensitive organic component contained in the photosensitive glass powder-containing paste is not particularly restricted. Examples of the photosensitive organic component include photosensitive monomers, photosensitive oligomers, and photosensitive polymers. The photosensitive monomers, photosensitive oligomers, and photosensitive polymers means monomers, oligomers, and polymers that, when irradiated with an active ray, undergo a reaction such as photocross-linking or photopolymerization to change their chemical structures.

Preferably, the photosensitive monomer is a compound having an active carbon-carbon unsaturated double bond(s). Examples of such a compound include a compound having a vinyl group, an acryloyl group, a methacryloyl group, or an acrylamide group. Preferably, the photosensitive monomer is a polyfunctional acrylate compound or a polyfunctional methacrylate compound in order to increase the density of the photocross-linking and allow formation of a high-precision pattern.

Preferably, the photosensitive oligomer or the photosensitive polymer is an oligomer or polymer having an active carbon-carbon unsaturated double bond(s) and having a carboxyl group(s). Such an oligomer or polymer is obtained by copolymerizing a carboxyl group-containing monomer such as acrylic acid, methacrylic acid, itaconic acid, crotonic acid, maleic acid, fumaric acid, vinylacetic acid, or an acid anhydride thereof, and a methacrylic acid ester, an acrylic acid ester, styrene, acrylonitrile, vinyl acetate, or 2-hydroxy acrylate. Methods for introducing an active carbon-carbon unsaturated double bond into an oligomer or a polymer include a method comprising reacting acrylic acid chloride, methacrylic acid chloride, or allyl chloride, an ethylenically unsaturated compound having a glycidyl group or an isocyanate group, or a carboxylic acid such as maleic acid with a mercapto group, an amino group, a hydroxy group or a carboxyl group in the oligomer or polymer.

A photosensitive monomer or a photosensitive oligomer having a urethane bond can be used to obtain a glass powder-containing paste that can alleviate the stress at early stage of the firing step and is less likely to cause pattern defects during the firing step. The photosensitive glass powder-containing paste may contain, as necessary, a photopolymerization initiator. The photopolymerization initiator refers to a compound that produces a radical in response to irradiation of an active ray.

Any photopolymerization initiator can be used. For example, the photopolymerization initiator is benzophenone, methyl ortho-benzoylbenzoate, 4,4-bis(dimethylamino)benzophenone, 4,4-bis(diethylamino)benzophenone, 4,4-dichlorobenzophenone, 4-benzoyl-4-methyl diphenyl ketone, dibenzyl ketone, fluorenone, 2,2-dimethoxy-2-phenylacetophenone, 2-hydroxy-2-methylpropiophenone, thioxanthone, 2-methylthioxanthone, 2-chlorothioxanthone, 2-isopropylthioxanthone, diethylthioxanthone, benzyl, benzyl methoxyethyl acetal, benzoin, benzoin methyl ether, benzoin butyl ether, anthraquinone, 2-t-butylanthraquinone, anthrone, benzanthrone, dibenzosuberone, methylene anthrone, 4-azidobenzalacetophenone, 2,6-bis(p-azidobenzylidene)cyclohexanone, 2,6-bis(p-azidobenzylidene)-4-methylcyclohexanone, 1-phenyl-1,2-butadione-2-(O-methoxycarbonyl)oxime, 1-phenyl-1,2-propanedione-2-(O-ethoxycarbonyl)oxime, 1,3-diphenylpropanetrione-2-(O-ethoxycarbonyl)oxime, 1-phenyl-3-ethoxypropanetrione-2-(O-benzoyl)oxime, Michler ketone, 2-methyl-1-[4-(methylthio)phenyl]-2-morphorino-1-propanone, 2-benzyl-2-dimethylamino-1-(4-morpholinophenyl)butanone-1, naphthalenesulfonyl chloride, quinolinesulfonyl chloride, N-phenylthioacridone, benzothiazole disulfide, triphenylphosphine, benzoin peroxide or eosin, or combinations of a photo-reductive pigment such as methylene blue and a reducing agent such as ascorbic acid or triethanolamine.

When the photosensitive glass powder-containing paste contains a polymer having a carboxyl group as a photosensitive polymer, the photosensitive glass powder-containing paste has increased solubility in an aqueous alkaline solution for development. The acid value of the polymer having a carboxyl group is preferably 50 to 150 mg KOH/g. When the acid value is 150 mg KOH/g or less, broader development margin is obtained. When the acid value is 50 mg KOH/g or more, the solubility of the photosensitive glass powder-containing paste in an aqueous alkaline solution is not reduced, so that high-definition pattern can be obtained.

The photosensitive glass powder-containing paste can be obtained by preparing components so that a predetermined composition is obtained, and homogeneously mixing and dispersing them with three rollers or a kneader.

The viscosity of the photosensitive glass powder-containing paste can be adjusted, as appropriate, by varying the ratio of an inorganic powder, a thickener, an organic solvent, a polymerization inhibitor, a plasticizer, a precipitation preventive agent or the like to be added. The viscosity of the photosensitive glass powder-containing paste is preferably 2,000 mPa·s or more, more preferably 5,000 mPa·s or more. The viscosity is also preferably 200,000 mPa·s or less, more preferably 100,000 mPa·s or less. For example, a preferred viscosity is 2 to 5 Pa·s when the photosensitive glass powder-containing paste is applied on a substrate by spin coating, or 10 to 50 Pa·s when the paste is applied on a substrate by a blade coater method or a die coater method. When the photosensitive glass powder-containing paste is applied once by screen printing to obtain a coating film having a film thickness from 10 to 20 μm, the viscosity is preferably from 50 to 200 Pa·s.

Pattern Formation Step

The pattern formation step comprises, for example, an exposure step of exposing the coating film obtained in the application step to light through a photomask having a predetermined opening, and a development step of dissolving and removing a part of the exposed coating film which is soluble in a developer.

The exposure step is a step of exposing to light and allowing a necessary portion of the coating film to be photo-cured or allowing an unnecessary portion of the coating film to be photolyzed, thereby making a desired portion of the coating film soluble in a developer. The development step is a step of dissolving in a developer and removing the portion of the exposed coating film which is soluble in the developer to obtain a grid-like pre-firing pattern with only desired portions left.

The exposure step may employ a laser beam or the like to directly draw a arbitrary pattern without a photomask. The exposure apparatus may be, for example, a proximity exposure apparatus. The active ray irradiated in the exposure step may be, for example, a near infrared ray, a visible ray, or an ultraviolet ray, and preferably is an ultraviolet ray. The light source may be, for example, a low-pressure mercury lamp, a high-pressure mercury lamp, an ultra-high pressure mercury lamp, a halogen lamp, or a germicidal lamp, and preferably is an ultra-high pressure mercury lamp.

The exposure conditions vary depending on the thickness of the coating film. Typically, exposure is performed for 0.01 to 30 minutes using an ultra-high pressure mercury lamp with a power of 1 to 100 mW/cm².

The development method in the development step may be, for example, a dipping method, a spraying method, or a brushing method. The developer is preferably selected, as appropriate, from solvents that is capable of dissolve unnecessary portions in the exposed coating film. Preferably, the developer is an aqueous solution mainly composed of water. For example, the developer to be selected may be an aqueous alkaline solution when the glass powder-containing paste contains a polymer having a carboxyl group. The aqueous alkaline solution may be, for example, an inorganic aqueous alkaline solution, such as sodium hydroxide, sodium carbonate, or calcium hydroxide, or an organic aqueous alkaline solution, such as tetramethylammonium hydroxide, trimethylbenzylammonium hydroxide, monoethanolamine, or diethanolamine. In particular, the aqueous alkaline solution preferably is an organic aqueous alkaline solution from the viewpoint of its ease of removal in the firing step. The concentration of the aqueous alkaline solution is preferably 0.05% by mass or more, more preferably 0.1% by mass or more. The concentration of the aqueous alkaline solution is also preferably 5% by mass or less, more preferably 1% by mass or less. When the concentration of the aqueous alkaline solution is 0.05% by mass or more, sufficient removal of unnecessary portions in the exposed coating film is likely to be achieved. On the other hand, when the alkali concentration is 5% by mass or less, the grid-like pre-firing pattern is less likely to be detached or corroded. The development temperature is preferably 20 to 50° C. for the purpose of ease of process control.

Pattern formation via exposure and development requires the glass powder-containing paste that is applied in the application step to be photosensitive. That is, the glass powder-containing paste is required to contain a photosensitive organic component. The percentage of the organic component in the photosensitive glass powder-containing paste is preferably 30% by mass or more, more preferably 40% by mass or more. The percentage of the organic component in the photosensitive glass powder-containing paste is preferably 80% by mass or less, more preferably 70% by mass or less. When the percentage of the organic component is 30% by mass or more, the dispersibility of the inorganic component in the paste is lowered, so that fewer defects occur during the firing step. In addition, the paste has suitable viscosity, as well as excellent applicability and stability. On the other hand, when the percentage of the organic component is 80% by mass or less, the grid-like pattern is less likely to show large contraction percentage during the firing step, producing fewer defects.

To almost completely remove the organic component and ensure a strength of the barrier rib to be finally obtained in the firing step, the glass powder contained in the photosensitive glass powder-containing paste preferably has a softening point of 480° C. or higher.

Firing Step

The firing step is a step of firing the grid-like pre-firing pattern obtained in the pattern formation step; degrading and removing the organic components contained in the glass powder-containing paste; and softening and sintering the glass powder, to obtain a grid-like post-firing pattern, i.e., a barrier rib.

The firing conditions vary depending on the composition of the glass powder-containing paste and the type of the substrate. For example, firing may be performed in a firing furnace under an air, nitrogen, or hydrogen atmosphere. The firing furnace may be, for example, a batch firing furnace or a belt continuous firing furnace. The firing temperature is preferably 500° C. or higher, more preferably 550° C. or higher. The firing temperature is also preferably 1000° C. or lower, more preferably 700° C. or lower, still more preferably 650° C. or lower. When the firing temperature is 500° C. or higher, sufficient degradation and removal of the organic components can be achieved. On the other hand, when the firing temperature is 1000° C. or lower, the substrate to be used is not limited to a highly heat resistant ceramic plate or the like. The firing time is preferably from 10 to 60 minutes.

In the method of manufacturing a scintillator panel in the present embodiment, a base used in the formation of a barrier rib may be used as a substrate of the scintillator panel, or the barrier rib may be detached from the base and then the detached barrier rib may be placed on the substrate. The method used for detaching a barrier rib from a base may be a known method, such as a method comprising providing a detachment supporting layer between the base and the barrier rib.

(Reflective Layer Formation Step)

The method of manufacturing scintillator panels in the present embodiment comprises a reflective layer formation step of forming a metallic reflective layer on the surface of the barrier rib. The metallic reflective layer is required to be formed on at least part of the surface of the barrier rib.

Any method of forming a metallic reflective layer can be used. For example, a metallic reflective layer can be formed by a vacuum film formation method, such as vacuum deposition, sputtering, or CVD, a plating method, a paste application method, or a spray injection method. In particular, a metallic reflective layer formed by a sputtering method is preferred in view of higher uniformity of reflectivity and corrosion resistance than metallic reflective layers formed by other methods.

(Inorganic Protective Layer Formation Step)

The method of manufacturing scintillator panels in the present embodiment comprises an inorganic protective layer formation step of forming an inorganic protective layer on the surface of the reflective layer. Any method of forming an inorganic protective layer can be used. For example, an inorganic protective layer can be formed by a vacuum film formation method, such as vacuum deposition, sputtering, or CVD, a paste application method, or a spray injection method. In particular, an inorganic protective layer formed by a sputtering method is preferred in view of higher uniformity and corrosion resistance than inorganic protective layers formed by other methods. Details of the inorganic protective layer are as described above in relation to embodiments of the scintillator panel.

The method of manufacturing scintillator panels in the present embodiment may comprises an organic protective layer formation step of forming an organic protective layer. Any method of forming an organic protective layer can be used. For example, an organic protective layer can be formed by applying a solution containing a fluorine-containing resin or polysiloxane on a barrier rib substrate under vacuum, and drying it to remove the solvent. Preferably, the dried substrate is cured at higher temperature than the drying temperature. Curing of the substrate increases the degree of polysiloxane condensation, which improves the heat resistance and chemical resistance, so that the scintillator panel is likely to have increased initial luminance.

Preferably, the organic protective layer is mainly composed of polysiloxane, which comprises a hydrolyzed and partially condensed organosilane composed of organosilane represented by the general formula (1) described above in embodiments of the scintillator panel.

[Chem 6]

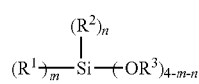
(1)

wherein, $R^1$ represents a monovalent organic group having at least one of epoxy group and acid anhydride group;

$R^2$ and $R^3$ each represent hydrogen, a $C_{1-6}$ alkyl group, a $C_{2-6}$ acyl group, or a $C_{6-16}$ aryl group;

m represents an integer from 1 to 3;

n represents an integer from 0 to 2;

m+n is 1 to 3;

when m is 2 or more, a plurality of R1 are optionally the same or different;

when n is 2, a plurality of R2 are optionally the same or different;

when m+n is 2 or less, a plurality of R3 are optionally the same or different.

Preferably, the organic protective layer is mainly composed of a fluorine-containing resin, which has a structure represented by the general formula (4) described above in embodiments of the scintillator panel.

[Chem 7]

(4)

In the general formula (4) above, $R^4$ to $R^7$ represent hydrogen, halogen, a substituted or unsubstituted alkyl group, a substituted or unsubstituted alkenyl group, a substituted or unsubstituted alkynyl group, a hydroxy group, a substituted or unsubstituted alkoxy group, a substituted or unsubstituted aryl group, a cyano group, an aldehyde group, a substituted or unsubstituted ester group, an acyl group, a carboxyl group, a substituted or unsubstituted amino group, a nitro group, or a substituted or unsubstituted epoxy group. Alternatively, two of $R^4$ to $R^7$ may together form a ring structure. However, at least one of $R^4$ to $R^7$ is a fluorine atom, or a group containing a fluorine atom. One or more of $R^4$ to $R^7$ is preferably a fluorine atom, and two or more is more preferably a fluorine atom. Examples of substituents when the groups are substituted include halogens, alkyl groups, aryl groups, and alkoxy groups. $R^4$ to $R^7$ may be the same or different.

In the general formula (4) above, the alkyl group may be chain or cyclic, and preferably is $C_{1-12}$. Preferably, the alkenyl group is $C_{1-15}$. Preferably, the alkynyl group is $C_{1-10}$. Preferably, the alkoxy group is $C_{1-10}$. Preferably, the aryl group is $C_{6-40}$.

Preferably, the structure represented by the general formula (4) above has a saturated ring structure. In an amorphous fluorine-containing resin having a saturated ring structure, the structure represented by the general formula (4) is preferably a structure represented by the general formula (5) described above.

(Loading Step)

The method of manufacturing scintillator panels in the present embodiment includes a loading step of loading phosphors into cells separated by barrier ribs. Any method can be used to load phosphors. For example, considering the simplicity of the process and the possibility of homogeneous loading of phosphors into a large area, preferred loading methods include mixing a phosphor powder and a binder resin in a solvent to obtain a phosphor paste, applying the paste on a barrier rib substrate, and drying the paste under vacuum to remove the solvent.

According to the method of manufacturing scintillator panels in the present embodiment, the scintillator to be obtained has high luminance and high image sharpness and is likely to achieve reduced occurrence of defects in high temperature and high humidity environments.

The above description has been made for one embodiment of the present invention. The present invention is not particularly limited to the embodiments described above. The above embodiments mainly illustrate aspects having the following configuration.

(1) A scintillator panel comprising a substrate, a grid-like barrier rib formed on the substrate, and a phosphor layer in a cell separated by the barrier ribs, wherein the barrier rib comprises on its surface in the following order a metallic reflective layer, and an inorganic protective layer mainly containing a nitride.

According to such a configuration, the scintillator panel has high luminance and high image sharpness and is likely to achieve prevention of luminance loss in high temperature and high humidity environments.

(2) The scintillator panel according to item (1), wherein the inorganic protective layer mainly contains silicon nitride.

According to such a configuration, the scintillator panel has higher luminance and higher image sharpness and is likely to achieve prevention of luminance reduction in high temperature and high humidity environments.

(3) The scintillator panel according to item (1) or (2), wherein the barrier rib further comprises an organic protective layer.

According to such a configuration, the scintillator panel is likely to have higher luminance and is likely to achieve prevention of occurrence of pinhole defects described later.

(4) The scintillator panel according to item (3), wherein the barrier rib comprises on its surface in the following order the metallic reflective layer, the inorganic protective layer, and the organic protective layer.

According to such a configuration, the scintillator panel is likely to have higher luminance.

(5) The scintillator panel according to item 3 or 4, wherein the organic protective layer mainly contains a fluorine-containing resin.

According to such a configuration, the scintillator panel is likely to have higher luminance.

(6) The scintillator panel according to item (5), wherein the fluorine-containing resin is amorphous.

According to such a configuration, the scintillator panel is likely to have higher luminance.

(7) The scintillator panel according to item (3) or (4), wherein the organic protective layer mainly contains polysiloxane.

According to such a configuration, the scintillator panel is likely to have higher luminance.

(8) The scintillator panel according to item (7), wherein the polysiloxane comprises a hydrolyzed and partially condensed organosilane comprising organosilane represented by the following general formula (1):

[Chem 8]

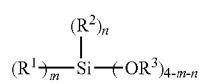

wherein, $R^1$ represents a monovalent organic group having at least one of epoxy group and acid anhydride group;

$R^2$ and $R^3$ each represent hydrogen, a $C_{1-6}$ alkyl group, a $C_{2-6}$ acyl group, or a $C_{6-16}$ aryl group;

m represents an integer from 1 to 3;
n represents an integer from 0 to 2;
m+n is 1 to 3;

when m is 2 or more, a plurality of $R^1$ are optionally the same or different;

when n is 2, a plurality of $R^2$ are optionally the same or different;

when m+n is 2 or less, a plurality of $R^3$ are optionally the same or different.

According to such a configuration, the scintillator panel is likely to have higher luminance and is likely to achieve prevention of occurrence of luminance unevenness described later.

(9) The scintillator panel according to item (8), wherein the organosilane represented by the general formula (1) comprises at least one of 2-(3,4-epoxycyclohexyl)ethyltrialkoxysilane and 3-trialkoxysilylpropylsuccinic anhydride.

According to such a configuration, the scintillator panel is likely to achieve further reduced occurrence of luminance unevenness described later.

(10) The scintillator panel according to any one of items (1) to (9), wherein the metallic reflective layer mainly contains silver.

According to such a configuration, the scintillator panel is likely to have further increased luminance.

(11) The scintillator panel according to item (10), wherein the metallic reflective layer contains a silver alloy containing at least one of palladium and copper.

According to such a configuration, the scintillator panel has more excellent discoloration resistance in the atmosphere.

(12) The scintillator panel according to any one of items (1) to (11), wherein the barrier rib contains 98% by volume or more of a low-softening-point glass having a softening point of 650° C. or lower.

According to such a configuration, the scintillator panel is likely to have further increased initial luminance.

(13) A radiation detector comprising the scintillator panel according to any one of items (1) to (12).

Such a configuration provides a radiation detector with high image sharpness.

(14) A method of manufacturing scintillator panels comprising a barrier rib formation step of forming barrier ribs on a substrate to obtain a separated cell; a reflective layer formation step of forming a metallic reflective layer on the surface of the barrier rib; an inorganic protective layer formation step of forming an inorganic protective layer on the surface of the reflective layer; and a loading step of loading phosphors into the cell separated by the barrier ribs; wherein the inorganic protective layer mainly contains a nitride.

According to such a configuration, the obtained scintillator panel has high luminance and high image sharpness and is likely to achieve prevention of luminance reduction in high temperature and high humidity environments.

EXAMPLES

The present invention will now be described in further detail with reference to Examples and Comparative Examples. However, the present invention is not limited thereto.

(Synthesis of Polysiloxane)

Compounds that are also used as abbreviations in Synthesis Examples and Examples are shown below.

PGMEA: propylene glycol monomethyl ether acetate

The solid content concentration in a polysiloxane solution in Synthesis Examples was determined by the following method. First, 1.5 g of a polysiloxane solution was weighed into an aluminum cup, and heated on a hot plate at 250° C. for 30 minutes to evaporate the liquid content. Based on the ratio of the weight before heating and the weight of the solid content left in the aluminum cup after heating, the solid content concentration of the polysiloxane solution was determined. The content ratio of organosilane units in polysiloxane was determined by performing a $^{29}$Si-NMR measurement, and calculating the ratio of the integrate for Si derived from a specific organosilane unit to the integrate for the entire Si derived from organosilane. Measurement samples (liquid) were injected into "Teflon" (registered trademark) NMR sample tubes having a diameter of 10 mm. The measurement conditions in $^{29}$Si-NMR are shown below.

Apparatus: nuclear magnetic resonance apparatus, JNM-GX270 (manufactured by JEOL Ltd.)
Method of measurement: gated decoupling method
Resonance frequency: 53.6693 MHz ($^{29}$Si nuclei)
Spectrum width: 20,000 Hz
Pulse width: 12 μs (45° pulse)
Pulse repeating time: 30.0 seconds
Solvent: Acetone-d6
Reference material: tetramethylsilane
Measurement temperature: 23° C.
Sample rotation speed: 0.0 Hz Organosilane used in synthesis of polysiloxane was as follows:
Organosilane S-1: methyltrimethoxysilane
Organosilane S-2: phenyltrimethoxysilane
Organosilane S-3: 2-(3,4-epoxycyclohexyl)ethyltrimethoxysilane
Organosilane S-4: 3-trimethoxysilylpropyl succinic anhydride Synthesis Example 1

Polysiloxane (A-1) Solution

To a 500-ml three-necked flask, 16.34 g (0.12 mol) of organosilane S-1, 29.75 g (0.15 mol) of organosilane S-2, 7.39 g (0.03 mol) of organosilane S-3, and 45.00 g of PGMEA were added. An aqueous phosphoric acid solution obtained by dissolving 0.16 g of phosphoric acid in 16.21 g of water (0.30% by weight relative to the monomer added) was added to the mixture over 30 minutes at room temperature with stirring. Then, after the flask was placed in an oil bath at 70° C. with stirring for 90 minutes, the oil bath was heated to 115° C. for 30 minutes. One hour after the start of heating, the temperature of the solution reached 100° C. Then, the solution was heated for 2 hours with stirring (the solution temperature was 100 to 110° C.) to obtain a polysiloxane solution. During heating of the oil bath and heating of the solution with stirring, nitrogen was introduced at 0.05 L/min. To the obtained polysiloxane solution was added 40% by weight of solid content concentration of PGMEA to obtain a polysiloxane (A-1) solution. The mole percentages of the repeating units derived from organosilanes S-1, S-2, and S-3 measured by $^{29}$Si-NMR were 40 mol %, 50 mol %, and 10 mol %, respectively.

Synthesis Example 2

Polysiloxane (A-2) Solution

A polysiloxane solution was obtained in the same manner as in Synthesis Example 1, except that 18.39 g (0.135 mol) of organosilane S-1, 29.75 g (0.15 mol) of organosilane S-2, 3.94 g (0.015 mol) of organosilane S-4, and 45.00 g of PGMEA were added, and an aqueous phosphoric acid solution obtained by dissolving 0.16 g of phosphoric acid in 16.21 g of water (0.30% by weight relative to the monomer added) was added to the mixture over 30 minutes at room temperature with stirring. To the obtained polysiloxane solution was added 40% by weight of solid content concentration of PGMEA to obtain a polysiloxane (A-2) solution. The mole percentages of the repeating units derived from organosilanes S-1, S-2, and S-4 measured by $^{29}$Si-NMR were 45 mol %, 50 mol %, and 5 mol %, respectively.

Synthesis Example 3

Polysiloxane (A-3) Solution

A polysiloxane solution was obtained in the same manner as in Synthesis Example 1, except that 20.02 g (0.147 mol) of organosilane S-1, 29.75 g (0.15 mol) of organosilane S-2, 0.74 g (0.003 mol) of organosilane S-3, and 45.00 g of PGMEA were added, and an aqueous phosphoric acid solution obtained by dissolving 0.15 g of phosphoric acid in 16.21 g of water (0.30% by weight relative to the monomer added) was added to the mixture over 30 minutes at room temperature with stirring. To the obtained polysiloxane solution was added 40% by weight of solid content concentration of PGMEA to obtain a polysiloxane (A-3) solution. The mole percentages of the repeating units derived from organosilanes S-1, S-2, and S-3 measured by $^{29}$Si-NMR were 49 mol %, 50 mol %, and 1 mol %, respectively.

Synthesis Example 4

Polysiloxane (A-4) Solution

A polysiloxane solution was obtained in the same manner as in Synthesis Example 1, except that 20.43 g (0.15 mol) of organosilane S-1, 29.75 g (0.15 mol) of organosilane S-2, and 45.00 g of PGMEA were added, and an aqueous phosphoric acid solution obtained by dissolving 0.15 g of phosphoric acid in 17.0 g of water (0.30% by weight relative to the monomer added) was added to the mixture over 30 minutes at room temperature with stirring. To the obtained polysiloxane solution, PGMEA was added to 40% by weight of solid content concentration to obtain a polysiloxane (A-4) solution. The mole percentages of the repeating units derived from organosilanes S-1 and S-2 measured by $^{29}$Si-NMR were 50 mol % and 50 mol %, respectively.

(Raw Materials of Glass Powder-Containing Pastes)

Raw materials used for preparing photosensitive glass powder-containing pastes were as follows:

Photosensitive monomer M-1: trimethylolpropane triacrylate

Photosensitive monomer M-2: tetrapropylene glycol dimethacrylate

Photosensitive polymer: product of addition reaction of 0.4 equivalents of glycidyl methacrylate to carboxyl groups of a copolymer composed of methacrylic acid/methyl methacrylate/styrene in a mass ratio of 40/40/30 (weight average molecular weight: 43000, acid value: 100)

Photopolymerization initiator: 2-benzyl-2-dimethylamino-1-(4-morpholinophenyl)butanone-1 (manufactured by BASF)

Polymerization inhibitor: 1,6-hexanediol-bis[(3,5-di-t-butyl-4-hydroxyphenyl)propionate]

Ultraviolet absorber solution: 0.3 mass % γ-butyrolactone solution of Sudan IV (manufactured by TOKYO OHKA KOGYO CO., LTD.)

Viscosity modifier: Flownon EC121 (manufactured by KYOEISHA CHEMICAL Co., LTD.)

Solvent: γ-butyrolactone

Low-softening-point glass powder: 27% by mass of $SiO_2$, 31% by mass of $B_2O_3$, 6% by mass of ZnO, 7% by mass of $Li_2O$, 2% by mass of MgO, 2% by mass of CaO, 2% by mass of BaO, 23% by mass of $Al_2O_3$; refractive index (ng): 1.56, glass softening point: 588° C., thermal expansion coefficient: $70\times10^{-7}$ $(K^{-1})$, average particle diameter: 2.3 μm High-softening-point glass powder: 30% by mass of $SiO_2$, 31% by mass of $B_2O_3$, 6% by mass of ZnO, 2% by mass of MgO, 2% by mass of CaO, 2% by mass of BaO, 27% by mass of $Al_2O_3$; refractive index (ng): 1.55, softening point: 790° C., thermal expansion coefficient: $32\times10^{-7}$ $(K^{-1})$, average particle diameter: 2.3 μm.

(Preparation of Glass Powder-containing Paste)

Glass Powder-containing Paste P-1:

First, 4 parts by mass of the photosensitive monomer M-1, 6 parts by mass of the photosensitive monomer M-2, 24 parts by mass of the photosensitive polymer, 6 parts by mass of the photopolymerization initiator, 0.2 parts by mass of the polymerization inhibitor, and 12.8 parts by mass of the ultraviolet absorber solution were dissolved in 38 parts by mass of the solvent under heating at 80° C. After cooling the obtained solution, 9 parts by mass of the viscosity modifier was added to obtain an organic solution 1. The obtained organic solution 1 was applied to a glass plate and dried to obtain an organic coating film having a refractive index (ng) of 1.555. To 50 parts by mass of the organic solution 1 was added 50 parts by mass of the low-softening-point glass powder. Then, the mixture was kneaded with a three-roll kneader to obtain a glass powder-containing paste P-1.

Glass Powder-containing Paste P-2:

A glass powder-containing paste P-2 was obtained in the same manner as the glass powder-containing paste P-1, except that 49 parts by mass of the low-softening-point glass powder and 1 part by mass of the high-softening-point glass powder were added to 50 parts by mass of the organic solution 1. The percentage of the volume of the low-softening-point glass to the total volume of the low-softening-point glass and the high-softening-point glass was 98% by volume.

Glass Powder-containing Paste P-3:

A glass powder-containing paste P-3 was obtained in the same manner as the glass powder-containing paste P-1, except that 40 parts by mass of the low-softening-point glass powder and 10 parts by mass of the high-softening-point glass powder were added to 50 parts by mass of the organic solution 1. The percentage of the volume of the low-softening-point glass to the total volume of the low-softening-point glass and the high-softening-point glass was 80% by volume.

(Preparation of Barrier Rib Substrate)

Barrier Rib Substrate 1:

A 125 mm×125 mm×0.7 mm soda glass plate was used as a substrate. The glass powder-containing paste P-1 was applied on the surface of the substrate using a die coater so that the thickness after drying was 220 and dried to obtain a glass powder-containing paste coating film. Next, the glass powder-containing paste coating film was exposed at an exposure amount of 300 mJ/cm² by an ultra-high pressure mercury lamp through a photomask having an opening corresponding to a desired pattern (chrome mask having a grid-like opening with a pitch of 127 μm and a line width of 15 μm). The exposed coating film was developed in an aqueous 0.5 mass % ethanolamine solution to remove unexposed parts, thereby obtaining a grid-like pre-firing pattern. The obtained grid-like pre-firing pattern was fired in air at 580° C. for 15 minutes to form a grid-like barrier rib mainly composed of glass. The barrier rib was cleaved to expose a cross section, which was then imaged and measured using a scanning electron microscope S2400 (manufactured by Hitachi, Ltd.). The height of the barrier rib, L1, was 150 μm, the interval between of the barrier ribs, L2, was 127 μm, the bottom width of the barrier rib, L3, was 30 μm, and the top width of the barrier rib, L4, was 10 μm.

Barrier Rib Substrate 2:

A barrier rib substrate 2 was formed in the same manner as the barrier rib substrate 1, except that the glass powder-containing paste P-2 was used. The height of the barrier rib, L1, was 150 μm, the interval between the barrier ribs, L2, was 127 μm, the bottom width of the barrier rib, L3, was 30 μm, and the top width of the barrier rib, L4, was 10 μm.

Barrier Rib Substrate 3:

A barrier rib substrate 3 was formed in the same manner as the barrier rib substrate 1, except that the glass powder-containing paste P-3 was used, and the firing temperature for the barrier rib was 590° C. The height of the barrier rib, L1, was 150 μm, the interval between the barrier ribs, L2, was 127 μm, the bottom width of the barrier rib, L3, was 30 μm, and the top width of the barrier rib, L4, was 10 μm.

(Formation of Metallic Reflective Layer)

A commercially available sputtering apparatus and sputtering targets were used. A glass plate was placed near a barrier rib substrate during sputtering. Sputtering was performed under such conditions that the metal thickness on the glass plate was 300 nm. The sputtering target used was a silver alloy containing palladium and copper, APC (manufactured by FURUYA METAL Co., Ltd.), or non-alloy silver. A cross section of the barrier rib was exposed using a triple ion beam milling system, EM TIC 3X (manufactured by Leica Microsystems Inc.) and imaged on a field emission scanning electron microscope (FE-SEM) Merlin (manufactured by Carl Zeiss AG). The thickness of the metallic reflective layer on the side of and at the center in the height direction of the barrier rib of each barrier rib substrate was measured to be 70 nm.

(Raw Materials of Metallic Oxide Reflective Layer Paste)

Raw materials used for preparing metallic oxide reflective layer pastes were as follows:

Metallic Oxide Filler: titanium oxide (manufactured by ISHIHARA SANGYO KAISHA, LTD.)

Binder solution: a mixed solution of 5% by mass of ethylcellulose (manufactured by The Dow Chemical Company) and 95% by mass of terpineol (manufactured by Nippon Terpene Chemicals, Inc.)

Monomer: a mixture of 30% by mass of dipentaerythritol pentaacrylate and 70% by mass of dipentaerythritol hexaacrylate (both are manufactured by TOAGOSEI CO., LTD.).

Polymerization initiator: 1,1'-azobis (cyclohexane-1-carbonitrile) (V-40; manufactured by FUJIFILM Wako Pure Chemical Corporation)

(Formation of Metallic Oxide Reflective Layer)

First, 50 parts by mass of the metallic oxide filler, 45 parts by mass of the binder solution, 4.5 parts by mass of the monomer, and 1.5 parts by mass of the polymerization initiator were kneaded in a three-roll kneader to obtain a metallic oxide reflective layer paste. The metallic oxide reflective layer paste was printed in vacuum onto a barrier rib, dried at 90° C. for 1 hour, and further cured at 190° C. for 1 hour to form a metallic oxide reflective layer.

(Measurement of Arithmetic Mean Inclination)

The barrier rib substrate after the formation of the reflective layer was cleaved to expose a cross section of the reflective layer on the side of the barrier rib. Five points in the side of the barrier rib were photographed using a laser microscope, VK-X200 (manufactured by KEYENCE CORPORATION) with a 50× objective lens. A line roughness analysis was performed over a 20-μm-long range at the center of the side of the barrier rib using an accessory analysis software. The mean value for the five points were determined to obtain an arithmetic mean inclination.

(Formation of Inorganic Protective Layer)

The commercially available sputtering apparatus and a sputtering target were used to form an inorganic protective layer composed of silicon nitride or silicon oxide. A glass plate was placed near a barrier rib substrate during sputtering. Sputtering was performed under such conditions that the thickness of the inorganic protective layer on the glass plate was 100 nm. The thickness of the inorganic protective layer on the side of and at the center in the height direction of the barrier rib of each barrier rib substrate was measured, in the same manner as the thickness of the metallic reflective layer, to be 20 nm. Only Example 14 performed sputtering under such conditions that the thickness of the inorganic protective layer on the glass plate was 20 nm, and the thickness of the inorganic protective layer on the side of and at the center in the height direction of the barrier rib of each barrier rib substrate was 4 nm.

(Formation of Organic Protective Layer (Organic Protective Layer Containing Polysiloxane))

An organic protective layer containing polysiloxane was formed as described below. For the barrier rib substrate, 1 part by mass of a polysiloxane solution was mixed with 10 parts by mass of γ-butyrolactone as a solvent to prepare a diluted solution. The polysiloxane solutions listed in table 1 were used in Examples and Comparative Examples. The diluted solution was printed in vacuum onto a barrier rib substrate, dried at 90° C. for 1 hour, and further cured at 190° C. for 1 hour to form an organic protective layer. In Table 1, the formation of the organic protective layer was performed according to the method described above before the formation of the reflective layer for samples listed in the "position of formation" column as "between barrier rib and reflective layer," or after the formation of the reflective layer for samples listed in the "position of formation" column as "on reflective layer," or twice before and after the formation of the reflective layer for samples listed in the "position of formation" column as "between barrier rib and reflective layer+on reflective layer." For samples in which an inorganic protective layer was formed and the position of the formation of the organic protective layer was on the reflective layer, the reflective layer, the inorganic protective layer, and the organic protective layer were formed in this order. In both cases of "between barrier rib and reflective layer" and "on reflective layer," the thickness of the organic protective layer on the side of and at the center in the height direction of the barrier rib of each barrier rib substrate measured in the same manner as the thickness of the metallic reflective layer was 1 μm.

(Formation of Organic Protective Layer (Organic Protective Layer Containing Fluorine-containing Resin))

An organic protective layer containing a fluorine-containing resin was formed as described below.

(Raw Materials of Organic Protective Layer Containing Fluorine-containing Resin)

The following raw materials were used to prepare a fluorine-containing resin solution for organic protective layer.

Fluorine-based solvent: CT-SOLV180 (manufactured by AGC Inc.)

Non-fluorine-based solvent: 1-methyl-2-pyrrolidone (manufactured by FUJIFILM Wako Pure Chemical Corporation)

Fluorine-containing resin raw material 1: CYTOP (registered trademark) CTL-809M (a 9% by mass solution of CYTOP type M (an amorphous fluorine-containing resin having a saturated ring structure, having a fluorine atom bound directly to an atom in the backbone, and having a silyl group in the end) diluted with CT-SOLV180, manufactured by AGC Inc.)

Fluorine-containing resin raw material 2: CYTOP (registered trademark) CTL-809A (a 9% by mass solution of CYTOP type A (an amorphous fluorine-containing resin having a saturated ring structure, having a fluorine atom bound directly to an atom in the backbone, and having a carboxyl group in the end) diluted with CT-SOLV180, manufactured by AGC Inc.)

Fluorine-containing resin raw material 3: CYTOP (registered trademark) CTX-809SP2 (a 9% by mass solution of CYTOP type S (an amorphous fluorine-containing resin having a saturated ring structure, having a fluorine atom bound directly to an atom in the backbone, and having no substituent in the end) diluted with CT-SOLV180, manufactured by AGC Inc.)

Fluorine-containing resin raw material 4: poly(2,2,3,3,4,4,4-heptafluorobutyl methacrylate, manufactured by Sigma-Aldrich Co. LLC.)

Preparation Example 1

Fluorine-containing Resin (B-1) Solution

One part by mass of the fluorine-containing resin raw material 1 was mixed with 1 part by mass of the fluorine-based solvent as a solvent to prepare a diluted solution.

Preparation Example 2

Fluorine-containing Resin (B-2) Solution

One part by mass of the fluorine-containing resin raw material 2 was mixed with 1 part by mass of the fluorine-based solvent as a solvent to prepare a diluted solution.

Preparation Example 3

Fluorine-containing Resin (B-3) Solution

One part by mass of the fluorine-containing resin raw material 3 was mixed with 1 part by mass of the fluorine-based solvent as a solvent to prepare a diluted solution.

Preparation Example 4

Fluorine-containing Resin (B-4) Solution

Five parts by mass of the fluorine-containing resin raw material 4 was mixed with 95 parts by mass of the non-fluorine-based solvent as a solvent to prepare a diluted solution.

The fluorine-containing resin solutions listed in Table 1 were used in Examples. The diluted solution was printed in vacuum onto a barrier rib substrate, dried at 90° C. for 1 hour, and further cured at 190° C. for 1 hour to form an organic protective layer. The thickness of the organic protective layer on the side of and at the center in the height direction of the barrier rib of each barrier rib substrate was measured, in the same manner as the thickness of the metallic reflective layer, to be 1 μm.

An organic protective layer composed of an acrylic resin was formed as described below. One part by mass of OLYCOX (registered trademark) KC7000 (manufactured by KYOEISHA CHEMICAL Co., LTD.) was dissolved in 20 parts by mass of γ-butyrolactone to prepare a diluted solution. The diluted solution was printed in vacuum onto a barrier rib substrate, and then dried at 90° C. for 1 hour. The thickness of the organic protective layer on the side of and at the center in the height direction of the barrier rib was measured, in the same manner as the thickness of the metallic reflective layer, to be 1 μm.

(Phosphor)

A commercially available phosphor powder, GOS: Tb (gadolinium oxysulfide doped with Tb) was directly used. The average particle diameter, D50, as measured with a particle size distribution analyzer MT3300 (manufactured by Nikkiso Co., Ltd.), was 11 μm.

(Binder Resin in Phosphor Layer)

The following resins were used:

Cellulose derivative: ETHOCEL (registered trademark) 7cp (manufactured by The Dow Chemical Company);

Butyral: S-LEC (registered trademark) B BL-S (manufactured by SEKISUI CHEMICAL CO., LTD.);

Acryl: OLYCOX (registered trademark) KC7000 (KYOEISHA CHEMICAL Co., LTD.);

Polyolefin: ARTON (registered trademark) D4540 (JSR Corporation).

(Formation of Phosphor Layer)

Ten parts by mass of a phosphor powder was mixed with 5 parts by mass of 10 wt % binder resin solution to prepare a phosphor paste. The solvent used for the cellulose derivative, butyral, and acrylic resin solutions was benzylalcohol. The solvent used for the polyolefin resin solution was cyclohexanone. The phosphor paste was printed in vacuum onto a barrier rib substrate on which a reflective layer, an inorganic protective layer, an organic protective layer, and the like had been formed, loading phosphors such that their volume fraction was 65%, and dried at 150° C. for 15 minutes to form a phosphor layer.

(Evaluation of Initial Luminance)

Scintillator panels after loading of phosphor layer were placed at the center of the sensor surface of an X-ray detector, PaxScan 2520V (manufactured by Varian Medical Systems, Inc.) in such an alignment that the cells in the scintillator panel have a one-to-one correspondence with the pixels of the sensor, then fixed with an adhesive tape at the substrate ends to prepare a radiation detector. To the detector, an X ray was irradiated from an X-ray irradiator, L9181-02 (manufactured by Hamamatsu Photonics K.K.) at a tube voltage of 50 kV and at a distance between the X-ray tube and the detector of 30 cm to obtain images. In the obtained images, the mean digital value from 256×256 pixels in the center of the light-emitting area on the scintillator panel was defined as the luminance value. For each sample, relative value to the luminance value from Example 1 was calculated and defined as the initial luminance. An initial luminance of less than 80 is considered as low luminance and not suitable.

(Wet Heat Resistance Test)

An accelerated test for defect occurrence in high temperature and high humidity environments was performed by leaving the obtained scintillator panel in a constant temperature and humidity chamber at a temperature of 65° C. and a humidity of 90% for 300 hours.

Evaluation for Luminance Maintenance Factor after Wet Heat Resistance Test

For the scintillator panels after the wet heat resistance test, the luminance values were measured in the same manner as the initial luminance, and the percentage to the luminance value of the samples before the wet heat resistance test was determined. A luminance maintenance factor after the wet heat resistance test of less than 80 is considered as not suitable for practical use.

Evaluation of Pinhole Number after Wet Heat Resistance Test

In X-ray images of the scintillator panels after the wet heat resistance test, pinhole-like lower luminance sites were counted.

(Discoloration Resistance Over Time)

Scintillator panel samples stored in an atmosphere at room temperature for one month after its preparation were visually checked for their surface discoloration. Those without any discoloration were evaluated as A, while those with little discoloration as B.

(Evaluation of Luminance Unevenness)

X-ray images of the scintillator panels were visually checked, and those without unevenness were evaluated as A, those with very slight unevenness as B, those with unevenness that can be easily corrected by image processing as C, and those with very noticeable unevenness as E.

Examples 1 to 19, Comparative Examples 1 to 5

A metallic reflective layer or a metallic oxide reflective layer was formed on a barrier rib substrate shown in Table 1 by the above-described method using materials shown in Table 1. Then, an inorganic protective layer and an organic protective layer were as shown in Table 1 were formed by the above-described method. Thereafter, a phosphor layer was formed by the above-described method using a binder resin shown in Table 1. The structures of and the evaluation results from Examples and Comparative Examples were shown in Table 1.

TABLE 1

| | barrier rib | reflective layer material | reflective layer arithmetic mean inclination | inorganic protective layer | organic protective layer resin type | organic protective layer resin solution | organic protective layer position of formation | phosphor resin | initial luminance | luminance unevenness | number of pinhole defects after wet heat resistance test | retention rate of luminance after wet heat resistance test | discoloration resistance over time |
|---|---|---|---|---|---|---|---|---|---|---|---|---|---|
| Example 1 | barrier rib substrate 1 | silver alloy | 12° | silicon nitride | poly-siloxane | A-1 | on reflective layer | ethylcellulose | 100 | A | 0 | 100 | A |
| Example 2 | barrier rib substrate 1 | silver alloy | 12° | silicon nitride | poly-siloxane | A-2 | on reflective layer | ethylcellulose | 100 | A | 0 | 100 | A |
| Example 3 | barrier rib substrate 1 | silver alloy | 12° | silicon nitride | poly-siloxane | A-1 | on reflective layer | butyral | 99 | A | 0 | 100 | A |
| Example 4 | barrier rib substrate 1 | silver alloy | 12° | silicon nitride | poly-siloxane | A-1 | on reflective layer | acryl | 100 | A | 0 | 100 | A |
| Example 5 | barrier rib substrate 1 | silver alloy | 12° | silicon nitride | poly-siloxane | A-3 | on reflective layer | ethylcellulose | 100 | B | 0 | 100 | A |
| Example 6 | barrier rib substrate 1 | silver alloy | 12° | silicon nitride | poly-siloxane | A-4 | on reflective layer | ethylcellulose | 97 | E | 0 | 100 | A |
| Example 7 | barrier rib substrate 1 | silver alloy | 12° | silicon nitride | poly-siloxane | A-1 | on reflective layer | polyolefin | 98 | C | 0 | 100 | A |
| Example 8 | barrier rib substrate 1 | silver alloy | 12° | silicon nitride | none | — | — | ethylcellulose | 91 | A | 15 | 100 | A |
| Example 9 | barrier rib substrate 1 | silver alloy | 8° | silicon nitride | poly-siloxane | A-1 | between barrier rib and reflective layer | ethylcellulose | 100 | A | 2 | 99 | A |
| Example 10 | barrier rib substrate 1 | silver alloy | 8° | silicon nitride | poly-siloxane | A-1 | between barrier rib and reflective layer + on reflective layer | ethylcellulose | 112 | A | 0 | 100 | A |
| Example 11 | barrier rib substrate 2 | silver alloy | 14° | silicon nitride | poly-siloxane | A-1 | on reflective layer | ethylcellulose | 97 | A | 0 | 99 | A |
| Example 12 | barrier rib substrate 3 | silver alloy | 25° | silicon nitride | poly-siloxane | A-1 | on reflective layer | ethylcellulose | 82 | A | 0 | 99 | A |
| Example 13 | barrier rib substrate 1 | silver | 12° | silicon nitride | poly-siloxane | A-1 | on reflective layer | ethylcellulose | 101 | A | 0 | 99 | B |
| Example 14 | barrier rib substrate 1 | silver alloy | 12° | silicon nitride (thin film) | none | — | — | ethylcellulose | 93 | A | 19 | 96 | A |
| Example 15 | barrier rib substrate 1 | silver alloy | 12° | silicon nitride | fluorine-containing resin | B-1 | on reflective layer | ethylcellulose | 110 | A | 0 | 100 | A |
| Example 16 | barrier rib substrate 1 | silver alloy | 12° | silicon nitride | fluorine-containing resin | B-2 | on reflective layer | ethylcellulose | 109 | A | 0 | 100 | A |
| Example 17 | barrier rib substrate 1 | silver alloy | 12° | silicon nitride | fluorine-containing resin | B-3 | on reflective layer | ethylcellulose | 106 | E | 0 | 100 | A |
| Example 18 | barrier rib substrate 1 | silver alloy | 12° | silicon nitride | fluorine-containing resin | B-4 | on reflective layer | ethylcellulose | 98 | E | 0 | 100 | A |
| Example 19 | barrier rib substrate 1 | silver alloy | 12° | silicon nitride | acryl | — | on reflective layer | ethylcellulose | 96 | A | 4 | 100 | A |
| Comparative Example 1 | barrier rib substrate 1 | silver alloy | 12° | none | none | — | — | ethylcellulose | 59 | A | 22 | 69 | A |

TABLE 1-continued

| | | reflective layer | | inorganic protective layer | organic protective layer | | | | | evaluation results | | | | |
|---|---|---|---|---|---|---|---|---|---|---|---|---|---|---|
| | barrier rib | material | arithmetic mean inclination | | resin type | resin solution | position of formation | phosphor resin | initial luminance | luminance unevenness | number of pinhole defects after wet heat resistance test | retention rate of luminance after wet heat resistance test | discoloration resistance over time |
| Comparative Example 2 | barrier rib substrate 1 | silver alloy | 12° | none | polysiloxane | A-1 | on reflective layer | ethylcellulose | 100 | A | 0 | 78 | A |
| Comparative Example 3 | barrier rib substrate 1 | silver alloy | 12° | silicon oxide | polysiloxane | A-1 | on reflective layer | ethylcellulose | 57 | A | 0 | 100 | A |
| Comparative Example 4 | barrier rib substrate 1 | metallic oxide | 38° | none | none | — | — | ethylcellulose | 65 | A | 0 | 100 | A |
| Comparative Example 5 | barrier rib substrate 1 | metallic oxide | 38° | silicon nitride | polysiloxane | A-1 | on reflective layer | ethylcellulose | 58 | A | 0 | 100 | A |

As shown table 1, the scintillator panels of Examples 1 to 19 in which the inorganic protective layer mainly containing a nitride was formed on the metallic reflective layer showed high initial luminance, and high luminance maintenance factor after a wet heat resistance test. The scintillator panels of Examples 1 to 4, which had an organic protective layer containing a hydrolyzed and partially condensed organosilane composed of organosilane represented by the general formula (1) described above, showed particularly high initial luminance and no luminance unevenness, as well as no pinhole defect. Luminance unevenness was observed in Example 5 containing small amount of a structure unit derived from organosilane represented by the general formula (1), Example 6 not containing the structure unit, and Example 7 containing polyolefin as a binder resin. Example 8 having no organic protective layer showed high initial luminance, but slightly lower initial luminance than the case having an organic protective layer. Example 9 having an organic protective layer between the barrier rib and the reflective layer showed particularly high initial luminance, no luminance unevenness, and reduced pinhole defects. The scintillator panel of Example 10 having organic protective layers both between the barrier rib and the reflective layer and on the reflective layer showed very high initial luminance and evaluated as good. The scintillator panels of Examples 11 and 12 in which the barrier rib contains a high-softening-point glass as a filler showed a tendency to have slightly decreased, but non-problematic level of, initial luminance as the content of the filler increased. The scintillator panel of Example 13 using silver as a material of the metallic reflective layer showed slight, but non-problematic level of, discoloration over time. Example 14 in which the inorganic protective layer had thin film thicknesses showed a tendency to have slightly decreased initial luminance and luminance maintenance factor after the wet heat resistance test. The scintillator panels of Examples 15 and 16 using, as an organic protective layer, an amorphous fluorine-containing resin having a saturated ring structure, having a fluorine atom directly bound to a backbone atom, and having a silyl group or a carboxyl group in the end, showed very high initial luminance, as well as other good properties. The scintillator panel of Examples 17 using, as an organic protective layer, an amorphous fluorine-containing resin having a saturated ring structure, having a fluorine atom directly bound to a backbone atom, and having no substituent in the end, showed very high initial luminance and was evaluated as good. The scintillator panel of Examples 18 using, as an organic protective layer, an amorphous fluorine-containing resin having neither a saturated ring structure nor a fluorine atom directly bound to a backbone atom, showed relatively high, but lower than Examples 15 to 17, initial luminance, as well as luminance unevenness. The scintillator panel of Example 19 having an acrylic organic protective layer showed no luminance unevenness and reduced pinhole defects.

On the other hand, the scintillator panels of Comparative Examples 1 and 2 without the inorganic protective layer mainly containing a nitride showed very low luminance maintenance factor after the wet heat resistance test, and were evaluated as not suitable. The scintillator panel of Comparative Example 1 also showed very low initial luminance and was evaluated as not suitable. The scintillator panel of Comparative Example 3 having an inorganic protective layer composed of silicon oxide showed very low initial luminance and was evaluated as not suitable. The scintillator panels of Comparative Examples 4 and 5 having a metallic oxide reflective layer instead of the metallic reflective layer showed low initial luminance and was evaluated as not suitable.

The above results demonstrated that according to the present invention a scintillator panel can be provided showing high luminance and high image sharpness, with its luminance reduction in high temperature and high humidity environments being prevented.

DESCRIPTION OF REFERENCE SIGNS

1: Radiation detector member
2: Scintillator panel
3: Output substrate
4: Substrate
5: Barrier rib
6: Phosphor layer
7: Diaphragm layer
8: Photoelectric conversion layer
9: Output layer 10: Substrate
11: Metallic reflective layer
12: Inorganic protective layer
13: Phosphor
14: Binder resin
L1: Height of barrier rib
L2: Interval between adjacent barrier ribs
L3: Bottom width of barrier rib
L4: Top width of barrier rib

The invention claimed is:

1. A scintillator panel comprising: a substrate; a grid-like barrier rib formed on the substrate; and a phosphor layer in a cell separated by the barrier ribs,
wherein the barrier rib comprises on its surface a metallic reflective layer, and an inorganic protective layer mainly containing a nitride, in this order,
wherein the thickness of the inorganic protective layer is 2 nm to 200 nm.

2. The scintillator panel according to claim 1, wherein the inorganic protective layer comprises silicon nitride.

3. The scintillator panel according to claim 1, wherein the grid-like barrier rib further comprises an organic protective layer.

4. The scintillator panel according to claim 3, wherein the grid-like barrier rib comprises on its surface the metallic reflective layer, the inorganic protective layer, and the organic protective layer, in this order.

5. The scintillator panel according to claim 3, wherein the organic protective layer comprises a fluorine-containing resin.

6. The scintillator panel according to claim 5, wherein the fluorine-containing resin is amorphous.

7. The scintillator panel according to claim 3, wherein the organic protective layer comprises polysiloxane.

8. The scintillator panel according to claim 7, wherein the polysiloxane comprises a hydrolyzed and partially condensed organosilane comprising organosilane represented by the following general formula (1):

[Chem 1]

(1)

wherein,
R$^1$ represents a monovalent organic group having at least one of an epoxy group and an acid anhydride group;
R$^2$ and R$^3$ each represent a hydrogen atom, a C$_{1-6}$ alkyl group, a C$_{2-6}$ acyl group, or a C$_{6-16}$ aryl group;
m represents an integer from 1 to 3;
n represents an integer from 0 to 2;
m+n is 1 to 3;
when m is 2 or more, a plurality of R$^1$ are optionally the same or different;
when n is 2, a plurality of R$^2$ are optionally the same or different;
when m+n is 2 or less, a plurality of R$^3$ are optionally the same or different.

9. The scintillator panel according to claim 8, wherein the organosilane represented by the general formula (1) comprises at least one of 2-(3,4-epoxycyclohexyl)ethyltrialkoxysilane and 3-trialkoxysilylpropylsuccinic anhydride.

10. The scintillator panel according to claim 1, wherein the metallic reflective layer comprises silver.

11. The scintillator panel according to claim 10, wherein the metallic reflective layer contains a silver alloy containing at least one of palladium and copper.

12. The scintillator panel according to claim 1, wherein the grid-like barrier rib contains 98% by volume or more of a low-softening-point glass having a softening point of 650° C. or lower.

13. A radiation detector comprising the scintillator panel according to claim 1.

14. The scintillator panel according to claim 1, wherein the organic protective layer is formed between the barrier rib and the metallic reflective layer.

15. A method of manufacturing scintillator panels, comprising:
a barrier rib formation step of forming barrier ribs on a substrate to obtain a cell separated by the barrier ribs;
a reflective layer formation step of forming a metallic reflective layer on the surface of the barrier rib;
an inorganic protective layer formation step of forming an inorganic protective layer on a surface of the reflective layer; and
a loading step of loading phosphors into the cell separated by the barrier ribs;
wherein the inorganic protective layer comprises a nitride,
wherein the thickness of the inorganic protective layer is 2 nm to 200 nm.

16. The method of manufacturing scintillator panels according to claim 15,
wherein the barrier rib further comprises an organic protective layer,
wherein the organic protective layer is formed between the barrier rib and the metallic reflective layer.

* * * * *